(12) United States Patent
Ernohazy et al.

(10) Patent No.: US 11,522,727 B2
(45) Date of Patent: Dec. 6, 2022

(54) COOPERATIVE POWER MANAGEMENT

(71) Applicant: Juniper Networks, Inc., Sunnyvale, CA (US)

(72) Inventors: Oscar Ernohazy, Saratoga, CA (US); Joshua Rosenthal, San Jose, CA (US); Jason Harris, San Martin, CA (US); John James Musante, Holtsville, NY (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 137 days.

(21) Appl. No.: 17/070,280

(22) Filed: Oct. 14, 2020

(65) Prior Publication Data
US 2022/0116235 A1    Apr. 14, 2022

(51) Int. Cl.
*G06F 1/00* (2006.01)
*H04L 12/10* (2006.01)
*G06F 1/3203* (2019.01)
*H04L 47/2425* (2022.01)
*H04M 7/00* (2006.01)
*G06F 1/26* (2006.01)

(52) U.S. Cl.
CPC ............ *H04L 12/10* (2013.01); *G06F 1/3203* (2013.01); *H04L 47/2433* (2013.01); *H04M 7/006* (2013.01); *G06F 1/26* (2013.01)

(58) Field of Classification Search
CPC ... H04L 12/10; H04L 47/2433; G06F 1/3203; H04M 7/006
USPC ....................................................... 713/300
See application file for complete search history.

(56) References Cited

U.S. PATENT DOCUMENTS

| 8,078,889 | B2* | 12/2011 | Jonnala ..................... G06F 1/26 713/320 |
| 8,594,854 | B1* | 11/2013 | Tareen .................... G06F 1/266 700/297 |
| 9,256,263 | B1* | 2/2016 | Narayanan ........... G06F 1/3243 |
| 9,268,383 | B2* | 2/2016 | Hua ........................ H04L 12/10 |

(Continued)

OTHER PUBLICATIONS

Extended Search Report from counterpart European Application No. 21150421.2, dated May 28, 2021, 9 pp.

(Continued)

*Primary Examiner* — Volvck Derose
(74) *Attorney, Agent, or Firm* — Shumaker & Sieffert, P.A.

(57) ABSTRACT

Embodiments are generally directed to managing power consumption of powered devices. In some embodiments, the powered devices draw power from a common source of power, which is limited. Under certain circumstances, exceeding the power limits can cause interruption of power to one or more of the devices, thus introducing a source of communication failures. To ensure reliable communications, an attempt to increase a power consumption of a first powered device in a power group is first reviewed to determine if the increase will cause a supplied power of the group to exceed a maximum power of the group. If the increase will cause the maximum power to be exceeded, the increase is modified, in some circumstances, to fit within the maximum power level. Alternatively, power consumption of a lower priority device is reduced to accommodate the requested power consumption increase.

20 Claims, 13 Drawing Sheets

(56) References Cited

U.S. PATENT DOCUMENTS

| | | | |
|---|---|---|---|
| 9,568,988 B1* | 2/2017 | Narayanan | G06F 1/30 |
| 10,423,217 B1* | 9/2019 | Bodireddy | G06F 1/3296 |
| 2006/0053324 A1* | 3/2006 | Giat | H04L 12/10 |
| | | | 713/300 |
| 2006/0063509 A1* | 3/2006 | Pincu | H04L 12/10 |
| | | | 455/67.11 |
| 2006/0133368 A1* | 6/2006 | Tolliver | H04L 12/44 |
| | | | 370/389 |
| 2007/0041387 A1* | 2/2007 | Ghoshal | H04L 12/10 |
| | | | 370/395.52 |
| 2007/0223520 A1* | 9/2007 | Diab | H04L 12/10 |
| | | | 370/463 |
| 2008/0005600 A1* | 1/2008 | Diab | G06F 1/3209 |
| | | | 713/300 |
| 2009/0041051 A1* | 2/2009 | Matityahu | H04L 43/00 |
| | | | 370/466 |
| 2010/0031066 A1* | 2/2010 | Geiger | H04L 12/10 |
| | | | 713/300 |
| 2010/0117808 A1* | 5/2010 | Karam | H04L 12/10 |
| | | | 713/300 |
| 2010/0171602 A1* | 7/2010 | Kabbara | G06F 1/266 |
| | | | 340/333 |
| 2010/0211806 A1* | 8/2010 | Diab | G06F 1/266 |
| | | | 713/310 |
| 2012/0317426 A1* | 12/2012 | Hunter, Jr. | H04L 12/40045 |
| | | | 713/300 |
| 2013/0318371 A1* | 11/2013 | Hormuth | G06F 11/3062 |
| | | | 713/320 |
| 2015/0312853 A1* | 10/2015 | Chandrasekaran | |
| | | | H04W 52/0209 |
| | | | 370/311 |

OTHER PUBLICATIONS

Response to Extended Search Report dated May 28, 2021, from counterpart European Application No. 21150421.2 filed Oct. 19, 2022, 32 pp.

* cited by examiner

700

|     | AP ID | PWR GROUP | SWITCH | PORT |
|-----|-------|-----------|--------|------|
|     | /710  | /715      | /720   | /725 |
| 751 | AP1   | 1         | 1      | 1    |
| 752 | AP2   | 1         | 1      | 2    |
| 753 | AP3   | 1         | 1      | 3    |
| 754 | AP4   | 2         | 2      | 3    |
| 755 | AP5   | 2         | 2      | 5    |
| 756 | ...   | ...       | ...    | ...  |
| 757 | ...   | ...       | ...    | ...  |
| 758 | ...   | ...       | ...    | ...  |
| 759 | AP N  | K         | L      | 1    |

| AP ID | QoS | | | VoIP | VIDEO | PRIORITY VALUE | MAPED PRIORITY |
|---|---|---|---|---|---|---|---|
| | HIGH | MED | LOW | | | | |
| AP1 | 10 | 3 | 14 | 12 | 5 | 349 | H |
| AP2 | 4 | 1 | 2 | 3 | 0 | 77 | L |
| AP3 | 12 | 4 | 13 | 6 | 0 | 213 | M |
| AP4 | 21 | 6 | 23 | 15 | 0 | 413 | H |
| AP5 | 11 | 23 | 41 | 6 | 4 | 406 | H |
| ... | ... | ... | ... | ... | ... | ... | |
| ... | ... | ... | ... | ... | ... | ... | |
| ... | ... | ... | ... | ... | ... | ... | |
| AP N | 3 | 25 | 34 | 1 | 1 | 219 | M |

FIG. 8

COOPERATIVE POWER MANAGEMENT

FIELD

The present disclosure is directed to power management. In particular, some embodiments relate to power management in network devices.

BACKGROUND

Internet of Things (IoT) devices and wireless access points (APs) are commonly connected to ports of backhaul devices such as ports of a computer network switch. In addition to providing data connection to/from the IoT device or/and AP and facilitating communication from/to an AP to/from the wired LAN/WAN, the switch port also supplies power to the AP.

There are several common techniques for providing power over Ethernet (PoE) cabling. Three such techniques have been standardized by IEEE 802.3. These standards are known as Alternative A, Alternative B, and 4PPoE. The standard defines powered devices (PD) as devices that consume power over the Ethernet connection. Examples of powered devices include IP phones, access points (APs), IP cameras, or IoT devices. The standard also defines power sourcing equipment (PSE). Examples of devices conforming to the PSE requirements include IP switches, or a PoE injector (AKA mid-span devices).

In addition to supplying power over Ethernet (PoE) on IP networks, the 802.3af standard also provides a means for communication between a PD and a PSE. Specifically, the Link Layer Discovery Protocol (LLDP) is a layer-2 Ethernet protocol for managing devices. LLDP allows an exchange of information between a PSE and a PD. This information is formatted in Type-length-value (TLV) format. PoE standards define TLV structures used by PSEs and PDs to signal and negotiate available power.

BRIEF DESCRIPTION OF THE FIGURES

The embodiments herein are better understood by referring to the following description in conjunction with the accompanying drawings in which like reference numerals indicate identically or functionally similar elements, of which:

FIG. 7 illustrates a system configuration table implemented in one or more example embodiments.

FIG. 8 is an illustrative example of an example table used in some embodiments for determining the priority associated with each AP.

DETAILED DESCRIPTION

Figure 1:
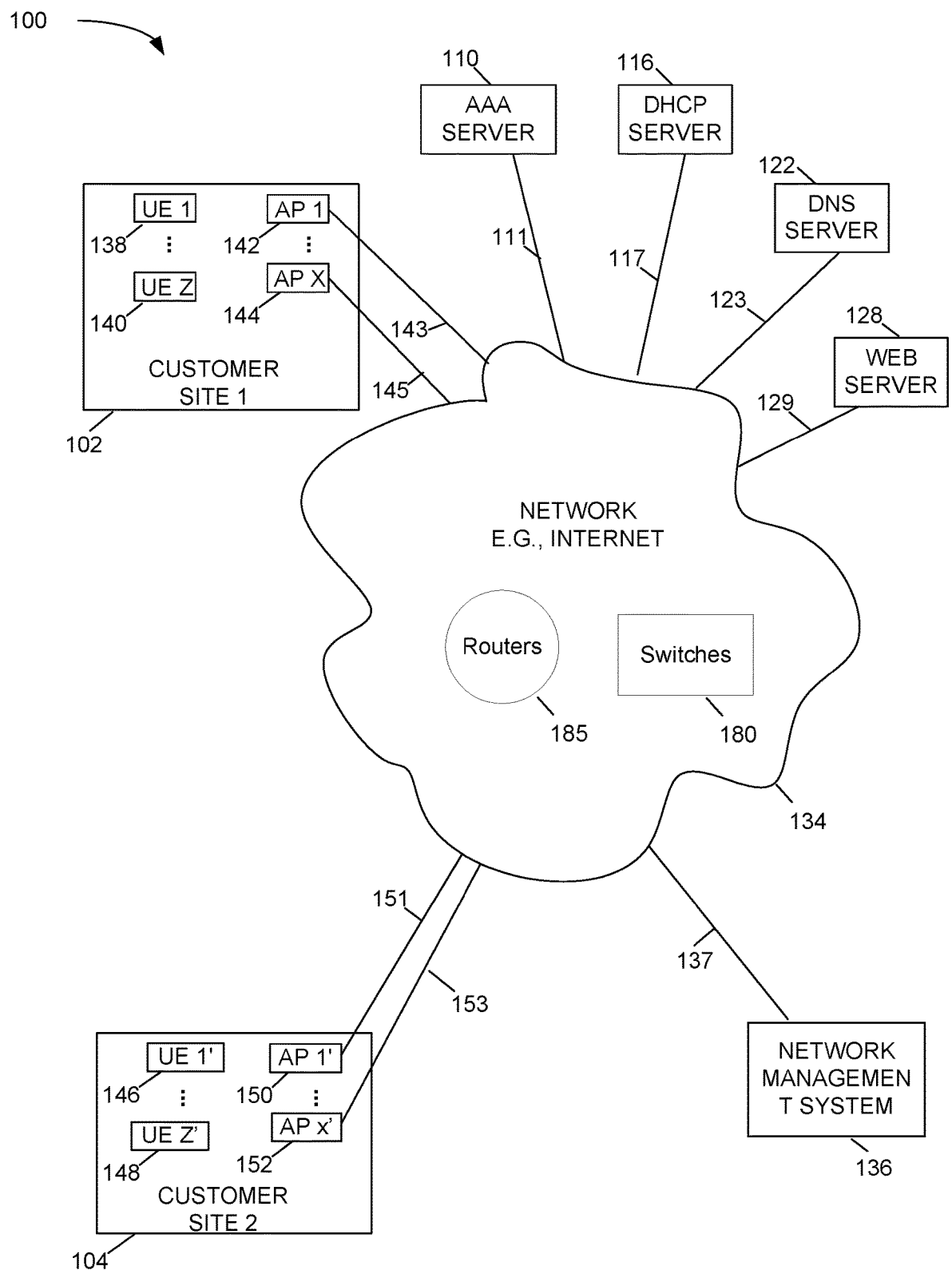
FIG. 1 shows an example system that is implemented in one or more of the disclosed embodiments.

In conventional implementations, transmission power of AP radios are statically configured. The transmission power is configured, in some circumstances, during initial provisioning of a wireless network. The transmission power is, in some embodiments, set to a level below a maximum possible power. This reduction in transmission power can assist in reducing interference that might otherwise occur between access points. For example, some access points positioned within a proximity of each other share wireless channels. This is true, for example, in Wi-Fi intensive environments where all or most available Wi-Fi channels are in use. In some cases, it can be desirable to reduce or eliminate a strength of a wireless signal beyond a particular perimeter. For example, a corporate wireless network is configured, in some cases, such that a signal of a corporate Wi-Fi network does not propagate beyond a boundary of a campus of the corporation.

Some implementations dynamically adjust transmission power levels of radios within a wireless network. Some of these implementations include a radio resource manager (RRM) that adjusts transmission power of the radios in a wireless system as to optimize operation of the system; e.g., to optimize the system level experience (SLE) experienced by a community of the users.

In some embodiments, a transmission power of a particular access point (e.g. a specific radio) is increased to improve reception by a specific user equipment (UE) device, such as a wireless terminal (WT). In some embodiments, a transmission power of an AP is reduced to reduce co channel interference. The resulting reduction in co channel interference, in some circumstances, results in a reduction in an error rate experienced on the channel.

Some of the disclosed embodiments operate in an environment in which a plurality of wireless network devices, such as access points, share power from a common power source, such as a power sourcing equipment (PSE) of the Power over Ethernet (PoE) standard. These devices that share the source of power are referred to as a power group.

An increase in transmission power of a first PD potentially increases an amount of power the first PD draws from the PSE. Because of this shared source of power, this increase competes for a finite amount of power provided by the PSE to the devices in the power group. In some PSE implementations, exceeding a maximum power that the PSE can provide results in the PSE invoking an overpower exception mechanism which results in a power shutdown on one or more ports of the PSE. This of course can cause one or more of the wireless devices drawing power from the PSE to lose power and therefore wireless functionality. To avoid exceeding a power limit of the PSE, the disclosed embodiments manage wireless devices in a power group such that a total amount of power drawn by the wireless devices in the power group does not exceed the power limit of the PSE.

Some embodiments provide for a power group controller that tracks power consumption of each PD included in a power group, and manages the collective power consumption of the power group so as to not exceed a power limit of the PSE. In some embodiments, the power group controller queries the PSE to determine its power limit and/or a current power level being supplied.

Switch ports are limited in an amount of power that each switch can provide. Thus, even if one port is consuming less power than a maximum power that a PSE can provide, power over the port can be limited by the port itself. Thus, a PSE includes two power limits in some embodiments. A first power limit is an amount of power the PSE can provide in total across all ports. A second power limit is an amount of power that can be delivered over a single port. Thus, some of the disclosed embodiments manage one or more of these power limits (e.g. a PSE total power limit across all ports and/or a PSE port power limit).

In addition to managing power consumed by devices connected to a switch, or devices connected to a single port of the switch, some embodiments provide for management of power across a switch port group. In these embodiments, a group of devices connected to multiple ports of a switch are configured to share power across the multiple ports, with the multiple ports not including all ports of the switch. Some of the disclosed embodiments manage a group of PDs with such a switch port group. Thus, the disclosed embodiments contemplate power management in consideration of at least three power constraints. Those power constraints are those of an individual switch port, a switch port group of a PSE, or of an entire PSE.

Thus, some embodiments contemplate switches that provide for configuration of a switch port group. The switch port group is defined to include a subset of all ports on the switch. The configuration also provides for an allocation of an absolute level or power, or a percentage of total available power to the switch port group. Such switches then expose an API that allows wireless network management devices, such as a remote resource manager discussed herein, to query information relating to said switch port group, and manage power consumption of devices under management to comply with parameters associated with the switch port group.

To manage power consumption of a power group when a power consumption demand of the group exceeds a power limit, the disclosed embodiments prioritize devices consuming power within the power group. Devices are then allocated power according to their priority. In some embodiments, the prioritized are based on a prioritization of traffic communicated by each of the devices. In some embodiments, the prioritization of traffic is based on quality of service (QoS) characteristics of the traffic. Thus, in these embodiments, a PD device passing traffic having a higher QoS requirement receives power at a higher priority than a PD device passing traffic having a relatively power QoS requirement.

Some embodiments provide for configuration of a power management controller. For example, the configuration informs the power management controller of one or more power limits of a switch port, a switch group, or a PSE as a whole. The configuration also informs the power management controller of devices included in one or more power groups. In some embodiments, configuration of the power management controller mirrors a physical configuration of PD devices with respect to a switch and/or PSE. Thus, for example, if two switch ports are physically configured to provide a shared source of power, the power management controller is configured, in some embodiments, to manage devices connected via those switch ports so as to not exceed the shared power capacity of the two switch ports. Thus, in at least some of these embodiments, the power management controller is not in communication with the switch, but instead operates independently to ensure PD devices in a power group do not exceed one or more power limits of the switch configuration. Some other embodiments provide for communication between the power management controller and a PSE or switch. This electronic communication allows the power management controller to obtain information from the switch and/or PSE regarding current power levels being provided to devices connected to the switch and/or PSE (e.g. on a per port and/or per PSE basis), and also information regarding limits relating to either ports and/or the PSE as a whole. By exchanging this information electronically, a reduction in manual configuration of the power management controller is obtained relative to those implementations that do not provide for an exchange of information between the switch/PSE and the power management controller.

FIG. 1 shows an example system 100 that is implemented in one or more of the disclosed embodiments. The example system 100 includes a plurality of access points (AP1 142, . . . , AP X 144, AP 1' 150, . . . , AP X' 152), a plurality of Authentication, Authorization and Accounting (AAA) servers (only one AA server 110 is shown), a plurality of Dynamic Host Configuration Protocol (DHCP) servers (only one DHCP server 116 is shown), a plurality of Domain Name System (DNS) severs (only one DNS server 122 is shown), a plurality of Web servers (only one Web server 128 is shown), and a network management system (NMS) 136, e.g., power management coordination, which are coupled together via network 134, e.g., the Internet and/or an enterprise intranet. Network communications links (137, 143, 145, 151, 153) couple the access points (AP1 142, AP X 144, AP 1' 150, AP X' 152), respectively, to network 134. Network communications link 111 couples the AA servers (only AA server 110 is shown) to network 134. Network communications link 117 couples the DHCP servers (only one DHCP server 116 is shown) to network 134. Network communications link 123 couples the DNS servers (only one DNS server 122 is shown) to network 134. Network communications link 129 couples the Web servers (only one Web server 128 is shown) to network 134. Network links 143, 145, 151, and 153 connect APs 142, 144 and APs 150, 152 to respective ports on switches 180 (only one switch is shown in the figure). In some embodiments, the ports of switch 180 provide IP connectivity to the APs 142, 144 and APs 150, 152 as well as provide the APs with operational power using PoE. The system 100 further includes a plurality of clients or user equipment devices (UE 1 138, . . . , UE Z 140, UE 1' 146, . . . , UEZ' 148. At least some of the UEs (138, 140, 146, and 148) are wireless devices which may move throughout system 100. The network 134 also includes, in some embodiments, routers 185.

In system 100, sets of access points are located at different customer premise site(s). Customer premise site 1 102, e.g., a mall, includes access points (AP 1 142, . . . , AP X 144). Customer premise site 2 104, e.g., a stadium, includes access points (AP 1, 150, . . . , AP X' 152). As shown in FIG. 1, UEs (UE 1 138, . . . , UE Z 140) are currently located at customer premise site 1 102; UEs (UE 1' 146, . . . , UE Z' 148) are currently located at customer premise site 2 104.

The network management system (NMS), 136, includes the RRM module that controls the transmission power of the various radios in the system. The NMS also communicates with the switch (or any other power feeding edge device) to ensure that increasing the power requirements from any switch port by an AP would not trigger the power protection mechanism of the associated switch. In some embodiments, the NMS includes a module that ensures that the configuration table properly reflects the right switch port to which the APs are actually connected. In accordance with yet another specific embodiment, upon detection of system table being misconfigured, and specifically, not reflecting the right switch port to which an AP is connected the NMS automatically suggests a corrective action to the IT technician, e.g., provides a proposal of how to reconfigure the switch. In some embodiments, the NMS automatically reconfigures the system configuration table to reflect the actual switch port to which the AP is connected and if indicated, configures the port of the switch to support the VPNs supported by the AP.

Figure 2:
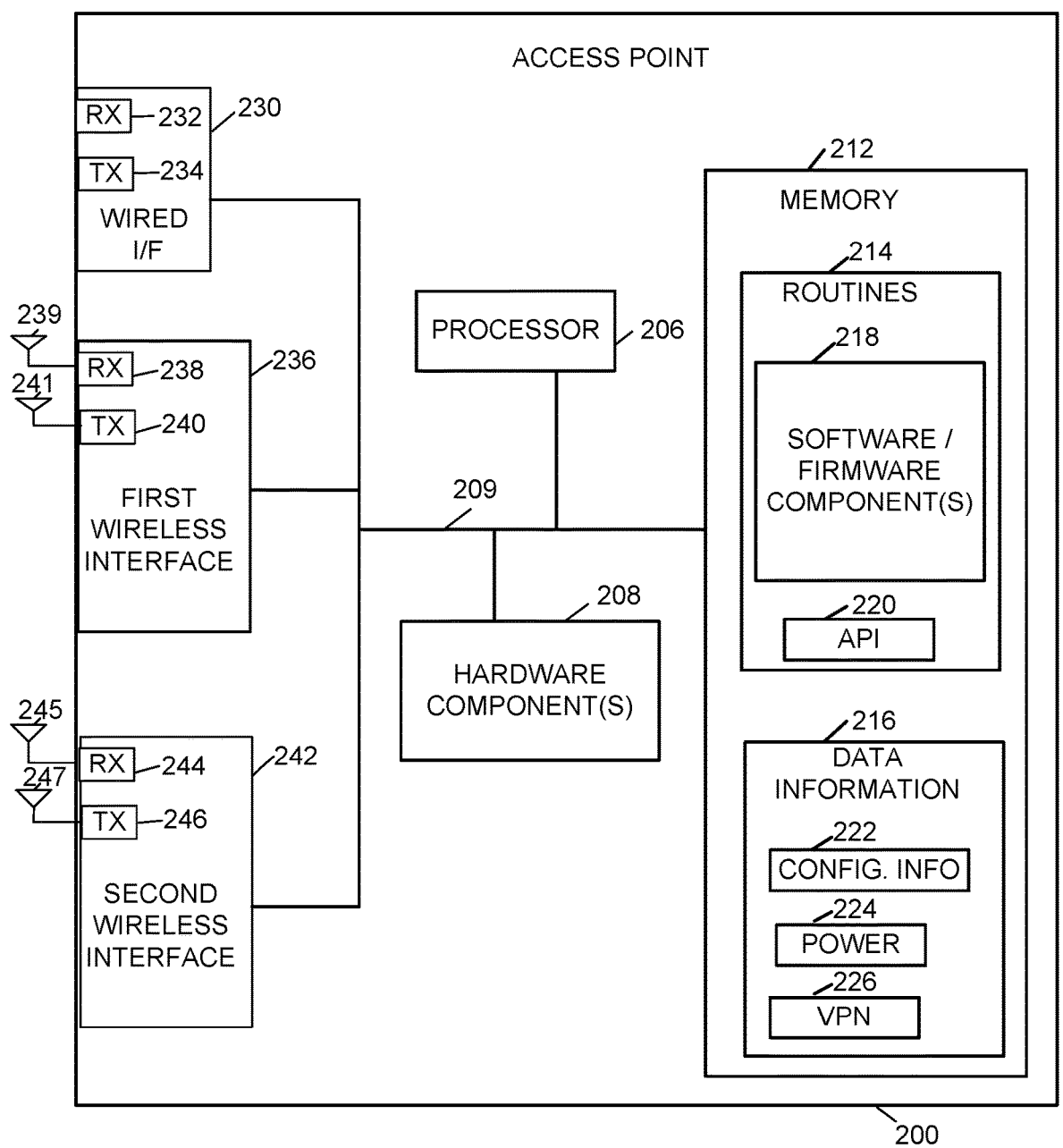
FIG. 2 illustrates an example access point.

FIG. 2 illustrates an example access point 200 that is implemented in one or more of the disclosed embodiments. The access point 200 represents, in some embodiments, one or more of the access points AP 1 142, . . . , APX 144, AP 1' 150, APX' 152, of FIG. 1. Access point 200 includes wired interfaces 230, wireless interfaces 236, 242, a hardware processor 206, e.g., a CPU, a memory 212, and an assembly of modules 208, e.g., assembly of hardware module, e.g., assembly of circuits, coupled together via a bus 209 over which the various elements may interchange data and information. Wired interface 230 includes receiver 232 and transmitter 234. The wired interface couples the access point 200 to the network 134 (e.g. the Internet) of FIG. 1, and provides power to the AP 200 using protocols such as PoE. First wireless interfaces 236 may support a Wi-Fi interface, e.g. IEEE 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242 may support Bluetooth® interface which includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of modules 218, e.g., an assembly of software modules, and an Application Programming Interface (API) 220. Data/information 216 includes configuration information 222, radio transmission power 224 and a list of supported VPNs 226 for tagging messages from clients associated with the AP.

Figure 3:
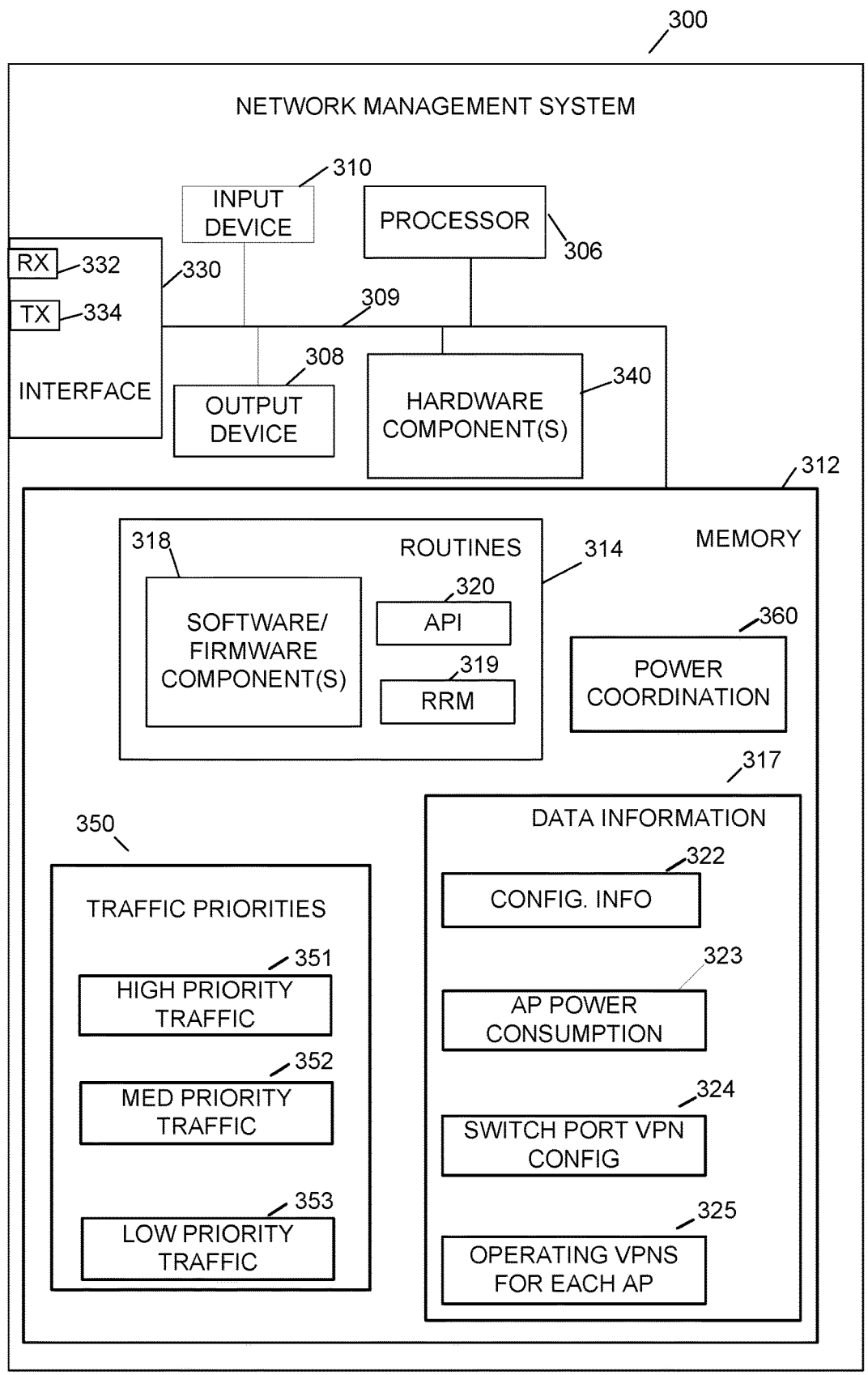
FIG. 3 illustrates an example network management system (NMS).

FIG. 3 illustrates an example network management system (NMS) 300. In some embodiments, the NMS 300 is equivalent to the NMS 136. The example NMS 300 includes a module that detects configuration inconsistencies and in some embodiments, invokes remedial actions. NMS 300 includes a communications interface 330, e.g., an Ethernet interface, a hardware processor 306, an output device 308, e.g., display, printer, etc., an input device 310, e.g., keyboard, keypad, touch screen, mouse, etc., a memory 312 and an assembly of modules 340, e.g., assembly of hardware module, e.g., assembly of circuits, coupled together via a bus 309 over which the various elements may interchange data and information. Communications interface 330 couples the NMS 300 to a network and/or the Internet. Communications interface 330 includes a receiver 332 via which the network monitoring system can receive data and information, e.g., including traffic profile parameters from the various APs, and a transmitter 334, via which the NMS 300 can send data and information, e.g., including configuration information, and confirm receipt of information from other devices of the network.

Memory 312 includes routines 314 and data/information 317. Routines 314 include assembly of modules 318, e.g., an assembly of software modules such as CVM, RRM routine 319 used for controlling the transmission power of the various APs, and Application Programming Interface (API) 320. Data/information 317 includes configuration information 322, power consumption of each AP 323, switch port configuration reflecting the switch ID and the specific switch port to which each AP is connected 324, and a list of operational VPNs for each AP 325.

Memory 312 includes also traffic priority module 350. The traffic priority module includes dynamic data about the types of data currently transmitted via each AP. For example, APs that carry VoIP or video traffic that is susceptible to network errors are marked as carrying higher priority traffic while TCP/IP data traffic is marked as lower priority traffic, in at least some embodiments. Similarly, in accordance with yet another embodiment, the system tags the priority of each AP based on the QoS of the IP traffic through the said AP.

The traffic priority module 350 includes tables that indicate the number of IP sessions (or data streams) via each AP and the corresponding priority of each one of the corresponding IP streams/sessions. Specifically, the traffic priority module includes entries for high priority media traffic 351, medium priority traffic 352, and low priority traffic 353.

When a RRM, in coordination with a switch determines that increasing transmission power of a specific AP, and accordingly increase the power requirements from a specific switch port, the power coordination system evaluates the overall priority of each AP within the same power group and determines whether there is an AP that carries lower priority information than the AP that the RRM wants to boost its transmission power. If such AP is found, the power coordination module 360 in coordination with the RRM issues a command to the AP which carries lower priority traffic to reduce its transmission power (and accordingly, to consume less power from its respective switch port). Once the second AP acknowledges that it reduced its power consumption, the RRM issues a command to the first AP to increase its transmission power.

Though the description above describe methods to mitigate brownout affecting wireless APs, it can equally apply to mitigating brownouts for any other powered devices, such as IoT etc.

Figure 4:
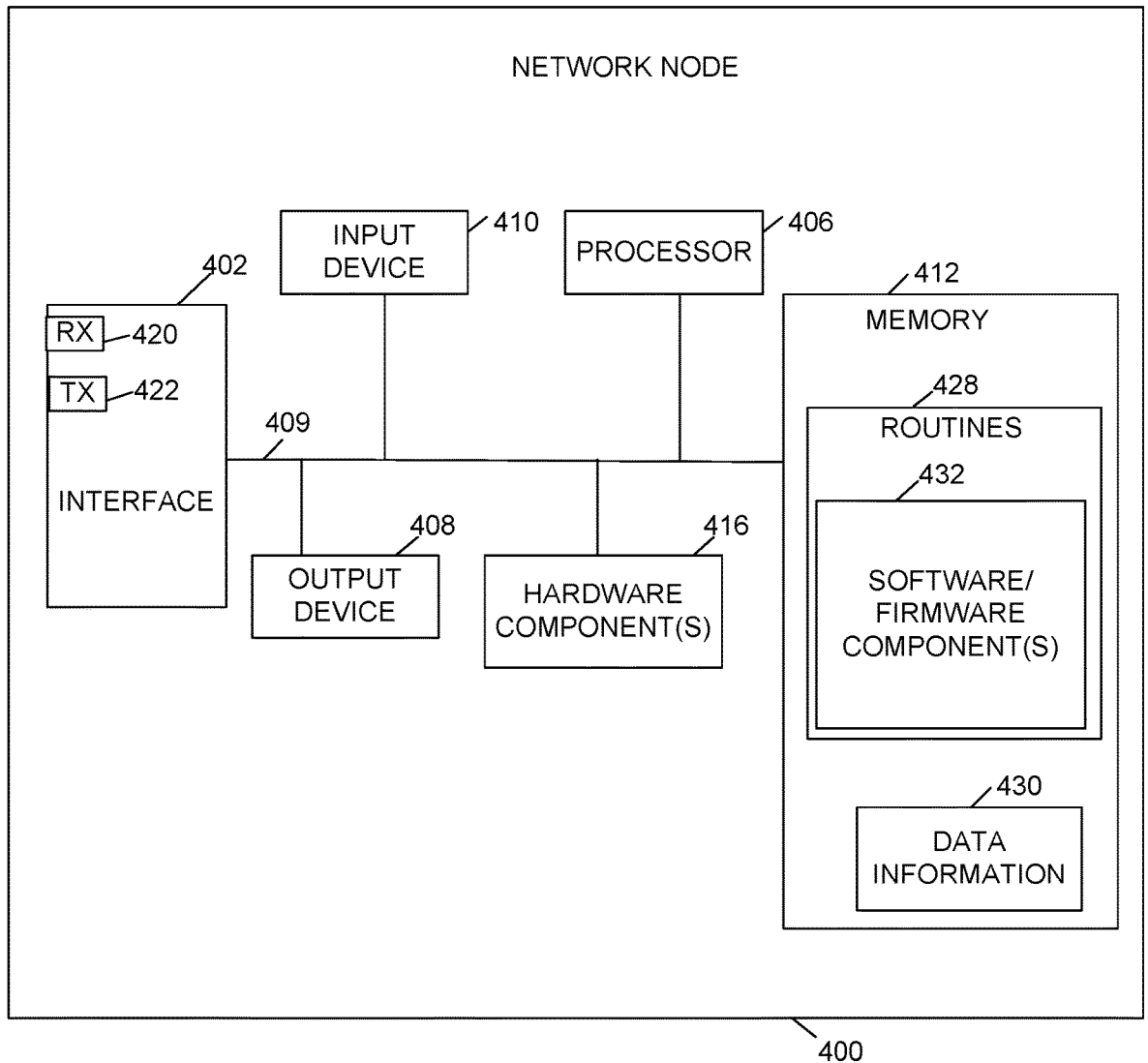
FIG. 4 illustrates an example node server.

FIG. 4 illustrates an example node server 400, such as an AA server, DHCP server, DNS server, or Web server. In some embodiments, node server 400 of FIG. 4 is one or more of server 110, 116, 122, 128, of FIG. 1. Node server 400 includes a communications interface 402, e.g., an Ethernet interface, a hardware processor 406, an output device 408, e.g., display, printer, etc., an input device 410, e.g., keyboard, keypad, touch screen, mouse, etc., a memory 412 and an assembly of modules 416, e.g., assembly of hardware module, e.g., assembly of circuits, coupled together via a bus 409 over which the various elements may interchange data and information. Communications interface 402 couples the node server 400 to a network and/or the Internet. Communications interface 402 includes a receiver 420 via which the node server can receive data and information, e.g., including operation related information, e.g., registration request, AA services, DHCP requests, Simple Notification Service (SNS) look-ups, and Web page requests, and a transmitter 422, via which the node server 400 can send data and information, e.g., including configuration information, authentication information, web page data, etc.

Memory 412 includes routines 428 and data/information 430. Routines 428 include assembly of modules 432, e.g., an assembly of software modules and data/information 430.

Figure 5:
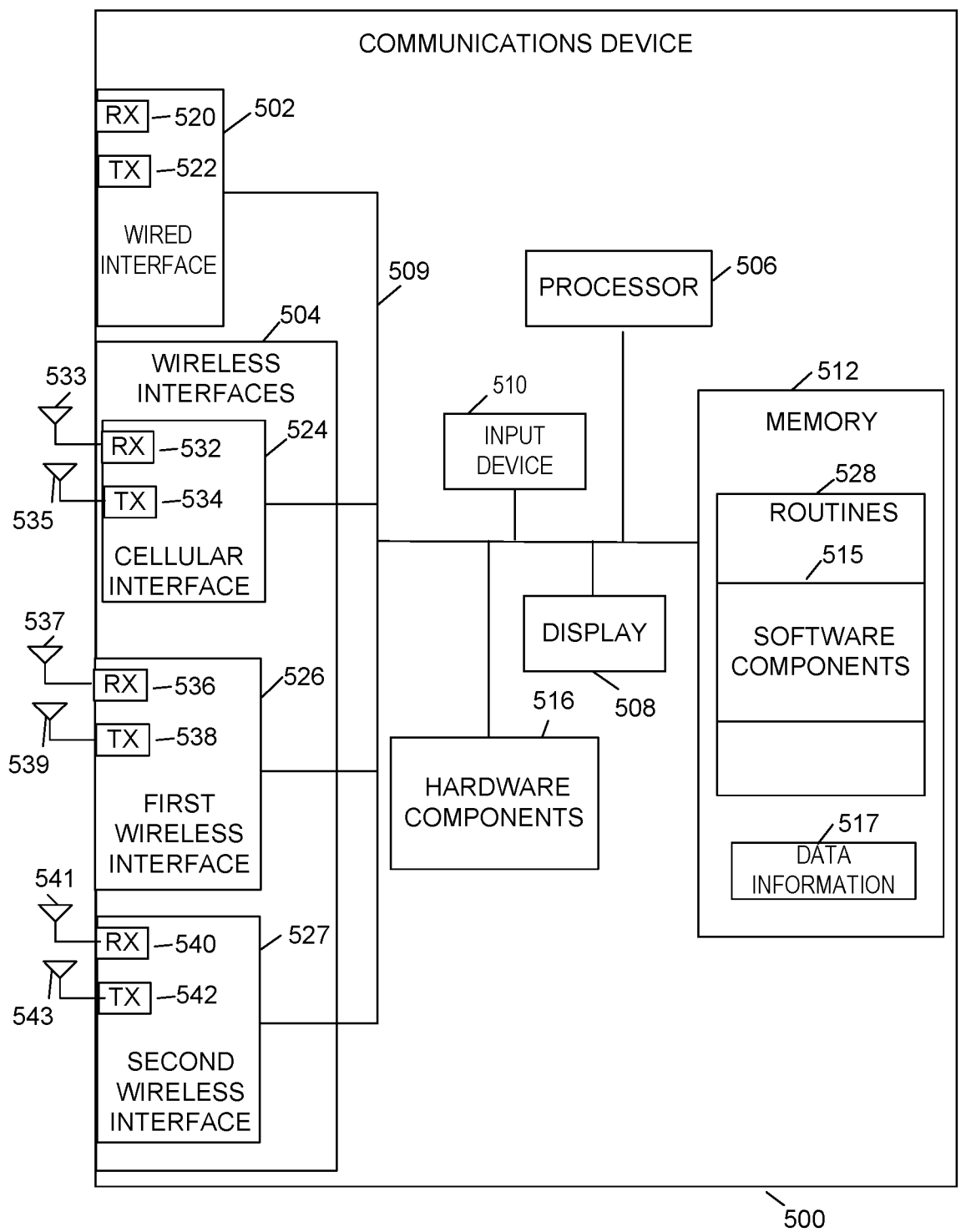
FIG. 5 illustrates an example client device.

FIG. 5 illustrates an example client device such as UE 500 (e.g., user equipment UE 1 138, ..., UE Z 140, UE 1' 146, ..., UE Z' 148) in accordance with some of the disclosed embodiments.

UE 500 includes wired interfaces 502, wireless interfaces 504, a hardware processor 506, e.g., a CPU, a memory 512, and an assembly of modules 516, e.g., assembly of hardware modules, e.g., assembly of circuits, coupled together via a bus 509 over which the various elements may interchange data and information. Wired interface 502 includes receiver 520 and transmitter 522. The wired interface couples the UE 500 to a network and/or the network 134 of FIG. 1.

The wireless interface 504 can include cellular interface 524, first wireless interface 526, e.g., IEEE 802.11 Wi-Fi interface, and a second wireless interface 527, e.g., Bluetooth® interface. The cellular interface 524 includes a receiver 532 coupled to a receiver antenna 533 via which the access point may receive wireless signals from access points, e.g., AP 1 142, ..., APX 144, AP 1' 150, ..., APX' 152, and transmitter 534 coupled to a transmit antenna 535 via which the access point may transmit wireless signals to APs, e.g., AP 1 142, ..., APX 144, AP 1' 150, ..., APX' 152. First wireless interfaces 526 may support a Wi-Fi interface, e.g. IEEE 802.11 interface, includes receiver 536 coupled to receive antenna 537, via which the UE may receive wireless signals from communications devices, e.g., APs, and transmitter 538 coupled to a transmit antenna 539 via which the UE may transmit wireless signals to communications devices, e.g., APs. The second wireless interface 527 may support Bluetooth® which includes receiver 540 coupled to receive antenna 541, via which the UE may receive wireless signals from communications devices, e.g., APs, and transmitter 542 coupled to a transmit antenna 543 via which the UE may transmit wireless signals to communications devices, e.g., APs.

The example UE 500 also includes an electronic display 508 and an input device 510.

Memory 512 includes routines 528 and data/information 517. Routines 528 include assembly of modules 515, e.g., an assembly of software modules. Data/information 517 may include configuration information as well as any additional information required for normal operations of UE 500.

Figure 6:
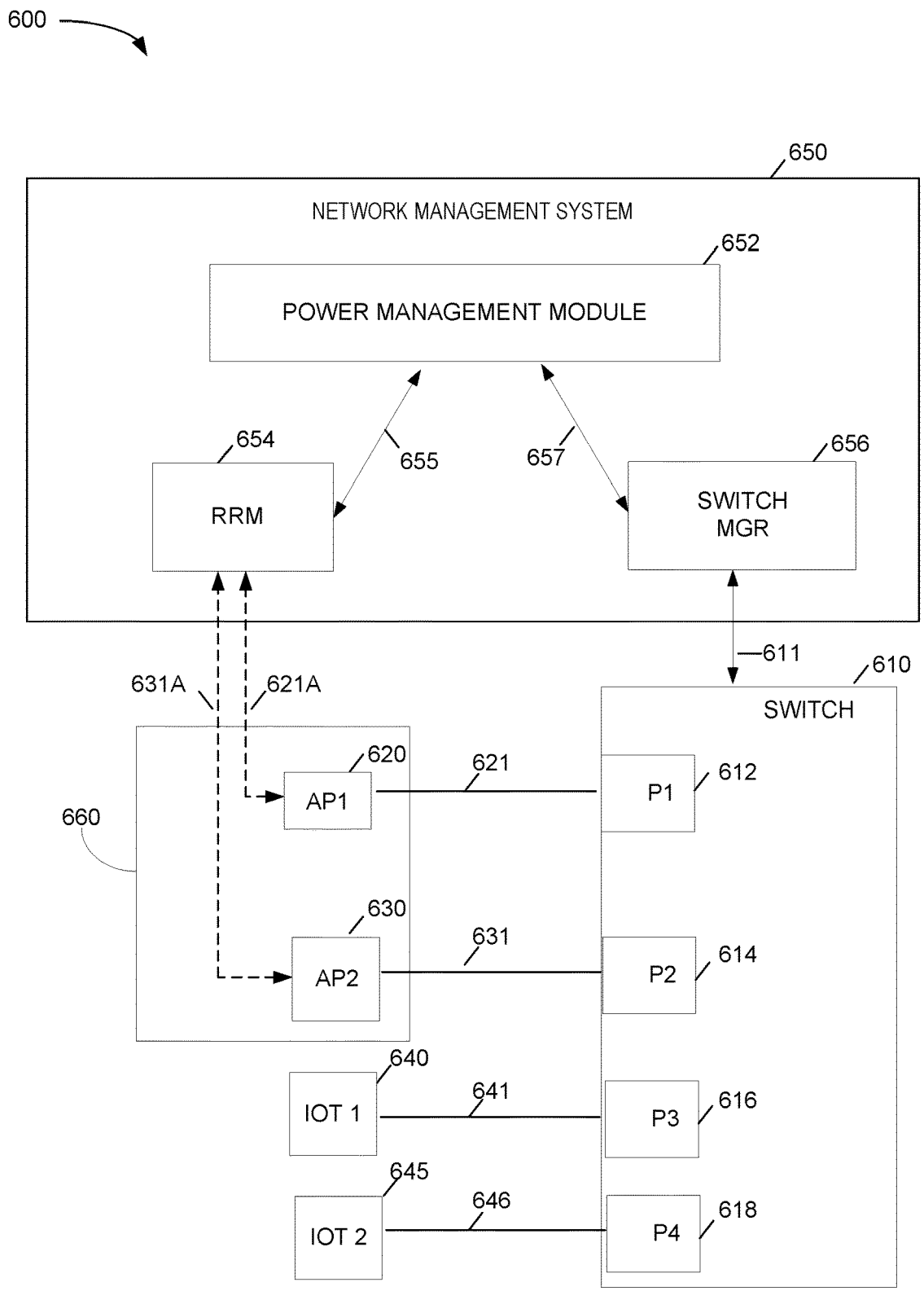
FIG. 6 shows an example network topology that includes network devices attached to ports of a switch (four ports are shown).

FIG. 6 shows an example network topology 600 that includes network devices attached to ports of a switch 610 (four ports are shown). Specifically, AP1 620 is connected to a port 612 of switch 610, AP2 630 is connected via network link 631 to a port 614 of switch 610, IoT 640 is connected via network link 641 to a port 616 of switch 610, and an IoT 645 is connected via a network link 646 to a port 618 of the switch 610.

In addition to providing IP connectivity, links 621, 631, 641 and 646 also provide power to the respective devices AP 620, AP 630, IoT 640 and IoT 645. As part of the system configuration, AP 620 and AP 630 are members of a common power group, power group 1 660. Power group 1 660 is managed by the RRM 654 and the power management module 652. In some embodiments, each of the devices AP 620, AP 630, IOT 640, and IOT 645 are powered devices (PDs) within a power over Ethernet (PoE) standard. In some embodiments, the switch 610 is power sourcing equipment (PSE) within a power over Ethernet (PoE) standard.

In some embodiments, the RRM 654 determines that a SLE can be improved by increasing the transmission power of an AP within the power group 660 (e.g. AP 62). Before the RRM 654 instructs the AP to increase its transmission power, the switch management module 656 verifies that power group 660 will not exceed a power limit of the switch 610 if the transmission power is increased. If the switch management module 656 determines (e.g. via communication with the switch 610 over link 611) that power group 660 has sufficient power margin (e.g. a difference between a currently supplied power level and a maximum power available to the power group) to accommodate this increase, the switch management module 656 communicates the information (e.g. via link 655, to the power management module 652, and then via link 657 to the RRM 654). In some embodiments, the switch management module 656 conveys the information directly to the RRM 654 without involvement of the power management module 652. The RRM 654 then instructs the AP 620 to increase its transmission power (e.g. via link 621A).

Alternatively, in some embodiments, the switch management module 656 determines that power group 660 does not have sufficient power margin to accommodate the increase of transmission power of AP 620. Information indicating same is then provided to the RRM 654 (either directly or via the power management module 652).

As explained below with reference to FIG. 8, power is prioritized to each of the devices included in a power group, such as the power group 660. In some embodiments, the prioritization of each of the devices is based on priorities of traffic or network messages passed (e.g. received and/or transmitted) by the respective device. In some embodiments, a device priority is based on IP traffic parameters of traffic sent and/or received by the respective device. Some embodiments periodically update the device's priority based on recent traffic activity. For example, a device may pass lower priority traffic during a first period of time and higher priority traffic during a second period of time. Some of the disclosed embodiments redetermine a priority of the device at an interval such that the device's priority is adjusted to accommodate a change in traffic of this type.

In some embodiments, a device priority is based on configuration information. For example, some embodiments implement configuration interfaces that allow an operator to set a device priority. Some embodiments determine a device priority based on both network traffic passed by the device and configuration information indicating the device priority. Some embodiments blend at least these two data to determine the device's priority that is then used to allocate power to the device.

To ensure the power group 660 does not exceed a power limit of the switch 610, the RRM 654, in some embodiments, relates a first priority of the AP 620 to a second priority of the AP 630. When the two devices AP 620 and AP 630 compete for power available from the switch, some embodiments grant power to the higher priority device and restrict power usage by the lower priority device as necessary to maintain a total power consumed by the two devices below a maximum power of the switch 610 and/or the ports 612 and/or 614 and/or the power group 660. Some embodiments allocate power to devices in a power group in proportion to their respective priorities. Thus, for example, in some embodiments, if a first device has a priority twice that of a second device, twice as much power is available to the first device as the second device. In circumstances where the first device is not fully utilizing power made available to it by the priority scheme, the second device may consume the available power until a time when that power is needed by the first device.

To ensure consumption of a power group is properly limited, and devices are allocated power in accordance with their respective priorities, some embodiments implement a control protocol between the RRM 654 and devices within the power group. The control protocol allows the RRM to selectively increase and/or decrease a power consumption authorization for a particular device. Thus, the RRM 654, in some embodiments, first instructs a first device, via the control protocol, to decrease its power utilization so as to provide available power to a second higher priority device of the power group. In these embodiments, the RRM 654 then second instructs the second higher priority device, via the control protocol, to increase its power utilization after the RRM 654 has confirmed that the first lower priority device has reduced its power consumption according to the first instruction. Before instructing the first lower priority device to reduce its power consumption, the RRM 654 confirms, in some embodiments, that insufficient power margin exists within the power group such that the second higher priority device cannot increase its power consumption without exceeding a power limit of the power group.

In some other embodiments, if the first device and second device of the power group are of equivalent priority, the RRM 654 may modify an amount of power increase available to the first device. For example, in some embodiments, a determination is made that the first device is to increase its transmission power by a first amount, for example, to improve a SLE with respect to one or more wireless terminals. The RRM 654 then determines that a power margin available to the power group is less than the first amount. Thus, there are several methods to resolve this incompatibility between the available power margin and the first amount. In some embodiments, the request to increase the first device's power by the first amount is rejected in view of the inadequate power margin. In another embodiment, the second device is instructed to decrease its power consumption. This decrease can be targeted to bring the second device's power consumption in accordance with the second device's priority. Thus, in this scenario, the second device was consuming power at a rate higher than its priority would generally allow. However, this higher consumption is permissible during periods of available power margin within the power group as a whole. This decrease in the second device's power consumption increases the available power margin, which, in some circumstances, becomes adequate to satisfy the first amount. Alternatively, after the second device has reduced its power consumption, the RRM may modify an amount of the first device's transmission power increase so as to fit within the power margin made available by the second device's reduction. This new increase amount is then communicated to the first device.

In some embodiments, one or more lower priority devices are requested to reduce their transmission power. This reduction in transmission power by the lower priority devices increases the power margin. The increased power margin provides an ability, at least in some circumstances, for the transmission power of AP1 620 to then be increased.

If a lower priority AP is detected, e.g., AP2, in some embodiments, the RRM 654 is notified. Alternatively, in some embodiments, the RRM 654 manages multiple APs and independently determines the relative priorities of the various APs and allocates the power to the APs to provide satisfactory SLE. The RRM 654 then instructs, in some embodiments, the AP2 630 via link 631A to reduce its transmission power. Upon receiving an acknowledgement that the AP2 630 has reduced its transmission power (and consequently reduced its power consumption), the RRM 654 instructs, in some embodiments, the AP1 620 over the link 621A to increase its transmission power. An ability to increase said transmission power is due to an increased power margin resulting from the power relinquished by the AP2 630.

The description above details a specific example wherein AP2 630 reduces its power consumption sufficiently to accommodate the desired increase in power transmission of the AP1 620. In some alternative embodiments, the AP2 630 is instructed to reduce its power by less than an additional power required by the AP1 and as such either additional APs are requested to reduce their transmission power or alternatively, the AP1 is instructed to increase its power less than a full extent that the RRM algorithm may suggest.

This described power management coordination ensures that a combination of powered devices in a power group do not consume more power than is available to the power group. Said differently, in some embodiments, a power management coordination module ensures that a collective power consumption of all of devices belonging to the said power group do not exceed a power threshold, as exceeding said power threshold could trigger a power protection mechanism of the PSE edge device, e.g., the switch 610.

In various embodiments, the communication between the switch 610, and the network management system 650, and/or one or more of RRM 654, switch management module 656, and power management module 652, utilizes LLDP (e.g., via links 621, 631, or via a dedicated communication link, e.g., such as link 611). Furthermore, while the one or more functions discussed above with respect to FIG. 6 are attributed to the RRM 654, switch management module 656, and the power management module 652, these functions are performed, in various embodiments, by any component of the network management system 650 and no limitations on these features being performed by the modules discussed above is implied.

FIG. 7 illustrates a system configuration table 700 implemented in one or more example embodiments. Column 710 provides the ID of each one of the APs in the system. Column 715 provides the power group (within the corresponding switch) to which the AP of column 710 belongs. Column 720 provides an ID of a switch to which each AP is attached. Column 725 stores a specific port to which each AP of column 710 is attached. Row 751, row 752, row 753, row 754, row 755, row 756, row 757, row 758, and row 759 illustrate, for each specific AP, a switch and a specific switch port to which the AP is attached. Each of the rows also indicate a specific power group to which the AP belongs. In some example embodiments, each row includes a list of VLANS supported on the specific switch port identified in column 720.

FIG. 8 is an example table 800 that illustrates an example method of determining the priority associated with each AP. Each of the rows 851-859 of the table 800 are associated with a unique network device, such as an access point. Column 810 provides IDs of the APs As shown, row 851 defines parameter values for an AP having an identifier of "API." Row 852 defines parameter values for an AP having an identifier of "AP2." Each row also defines priority information for a respective AP identified by the row. Column 815, 820 and 825 each provide a quantification of traffic having a particular QoS classification, shown in table 800 in units equivalent to a number of packets or a data size (e.g. in bytes) within a time window. The three columns 815, 820, and 825 represent high QoS (quality of service), medium QoS, and Low QoS data respectively. In some embodiments, columns 815, 820, and 825 indicate a number of packets having each of the respective QoS attributes. In other embodiments, columns 815, 820, and 825 indicate an amount of data (e.g. a number of bytes or number of packets) having each of the respective QoS attributes.

Column 830 defines a number of VoIP media streams each radio or AP is handling within the time window. In some embodiments, column 830 represents a number of VoIP bytes passed by the respective AP or individual AP radio during the time window. Column 835 provides a number of video media streams handled by each AP or individual AP radio within the time window. Note that while Table 800 of FIG. 8 lists traffic parameters of multiple APs, some APs include multiple radios. To accurately characterize each radio of each AP, Table 800 includes a row for each radio of each AP. In some embodiments, column 835 defines an amount (e.g., bytes) of video data handled by each AP or individual AP radio within the time window.

Some embodiments, determine, based on one or more of the values described above with respect to columns 815, 820, 825, 830, or 835, a priority value. This priority value is illustrated in FIG. 8 by column 840. In some embodiments, the priority of a particular value is determined based on Equation 1 below:

$$\text{Priority}(t) = K1*QoS_H + K2*QoS_M + 1K3*QoS_L + K4*N_{VoIP} + K5*N_{Video} \qquad \text{Eq 1.}$$

where:
t defines a window of time where the determined priority is applicable,
K1-K5 these are coefficients (constants),
$QoS_H$ a number of IP packets with a high QoS classification,
$QoS_M$ a number of IP packets with medium QoS classification,
$QoS_L$ a number of IP packets with low QoS classification,
$N_{VoIP}$ a number of IP VoIP media streams or bytes through the AP,
$N_{Video}$ a number of IP video media streams or bytes processed by the AP.

In some embodiments, priority values are mapped into a simple mapped priority which is provided in column 845. For example, priority values smaller than 100 are mapped to low priority "L", priority values higher than 400 are mapped to high priority "H", and the other priority values are mapped to medium priority "M".

In some embodiments, a threshold used in the mapping of priority values into mapped priorities is dynamically adjusted. For example, some embodiments determine a range of priority values and then define the threshold based on the range. For example, in some embodiments, thresholds are defined so as to delineate a highest third of the values be mapped priority "H", a lowest third of the values be mapped priority "L", and the remaining priority values mapped to priority "M".

While the example above illustrates operation of some embodiments with respect to determining a priority of network devices, such as APs, other embodiments utilize alternative algorithms for determining the relative priorities of the APs. For example, some embodiments utilize a machine learning model or other artificial intelligence techniques to determine device priorities.

FIG. 8 describes categorizing priority values into three categories, low, medium, and high. In other embodiments, column 840 represents a weight that is used to allocate power to the devices represented by the table 800. For example, some embodiments allocate power to each of the devices in proportion to the weight determined with respect to column 840. Thus, for example, some embodiments power is allocated to each device in proportion to the priority determined by Equation 1 above.

Some embodiments allocate power proportional to the priority of column 840 of FIG. 8 and/or the priority of Equation 1, while also ensuring a minimum power is allocated to each device. Thus, in these embodiments, a minimum power is allocated to each device (which is device specific in some embodiments and constant for all devices in other embodiments), and a remaining power is then allocated in proportion to a priority as illustrated in column 840 of FIG. 8 and/or determined via Equation 1 above.

Some embodiments allocate power to devices according to the priority of column 840 and/or Equation 1 above, but modify allocation from a proportional allocation as described above to an allocation that is based on a function that generates a power allocation based on the priority value. In some embodiments, the function is a logarithmic function or other non-linear function that generates a power allocation based on the priority value, but in a non-linear manner, and thus not directly proportional to the determined priority value of Equation 1 and/or the table 800 of FIG. 8.

Some embodiments allocate power between multiple network devices (e.g. APs) based on Equation 2 below:

$$AP_j \text{ power} = \text{Max } AP_j \text{ Power} - \Sigma_{i=1}^n \; Wt_{i \to j}(\text{RSSI}_{i \to j} + (\text{Max } AP_i \text{ Power} - APi \text{ current Power})) \qquad \text{Eq. 2}$$

where:
$AP_j$ Power Power setting for the $j^{th}$ AP,
Max $AP_i$ Power Maximum power setting for the $i^{th}$ AP,
Max $AP_j$ Power Maximum power of the radio of the $j^{th}$ AP,
n number of strong neighbors of the $j^{th}$ AP, with strong neighbors defined as a number of APs having signal strengths at APj above a predefined threshold,
$SS_{i \to j}$ signal strength of signal(s)s received by $AP_{j\,a}$ as a result of transmission by $AP_i$. and
$Wt_{i \to j}(\;)$ defined by Equation 3 below.)

$$Wt_{i \to j}(SS_{i \to j}) = (SS_{i \to j} - \text{Ave } SS)/\delta \qquad \text{Eq. 3}$$

where:
$SSI_{i \to j}$ a signal strength measurement of a signal as received from $AP_i$ by $AP_j$,
Ave SS average signal strength of a plurality of wireless devices. In some embodiments, the plurality of wireless devices is equivalent to a group of powered devices included in a power group. In some embodiments, the plurality of wireless devices is different from devices included in a power group. For example, in some embodiments, the plurality of wireless devices are wireless devices installed at a particular location/site, or devices within a predefined distance of each other.
δ standard deviation. In some embodiments, the standard deviation is defined by Equation 5 below.

The average signal strength (Ave SS) described above is calculated, in some embodiments, via:

$$\text{Ave } SS = (\Sigma_{All\,I\,\&\,J\,combinations} \; SS_{i \to j})/n \qquad \text{Eq. 4}$$

where:
Ave SS average signal strength measurement of the plurality of wireless devices discussed above,
n number of combinations of i and j resulting in signal strength (e.g. RSSI) measurement greater than a predetermined threshold The standard deviation is calculated, in some embodiments, by:

$$\delta = \sqrt{\left(\frac{1}{n-1}\right)\left(\sum_i (SSi - AveSS)**2\right)} \quad \text{Eq. 5}$$

where:
- δ standard deviation,
- $SS_i$ the ith signal strength measurement (e.g. RSSI) from the n measured signal strengths,
- n number of combinations of i and j resulting in signal strength measurement,
- Ave SS average signal strength for the power group of APs (e.g. calculated via equation 1 above).

While Equation 3 above uses the average signal strength, some embodiments utilize a median or other suitable measurement that can reduce the dependence on outlier values.

When evaluated for each powered device, Equation 2 defines power for each powered device. In some embodiments, power allocations defined by Equation 2 provide a balance between ensuring high RSSI to wireless terminals (e.g. wireless terminals served by and/or associated with APs, where the APs are included in the plurality of wireless devices discussed above), while minimizing interference between signals coming from two or more of the plurality of wireless devices (e.g. APs).

Embodiments that determine power allocations according to Equation 1 above, perform periodic re-determinations of power, at least in some embodiments. This re-determination provide for a dynamic power allocation to wireless devices based on one or more characterizations of their communication traffic (e.g. as illustrated above with respect to FIG. 8). Other embodiments that utilize Equation 2 allocate power more statically, with this allocation based on a physical topology of the AP network. For example, by considering RSSI strengths as described above with respect to FIG. 2, power allocation is based, at least in part, on attenuation of signals exchanged between the various APs (e.g. which is generally a function of distances between the APs.

Further embodiments that utilize Equation 2 are described in greater detail with respect to FIGS. 10A-B and 12 below.

Figure 9:
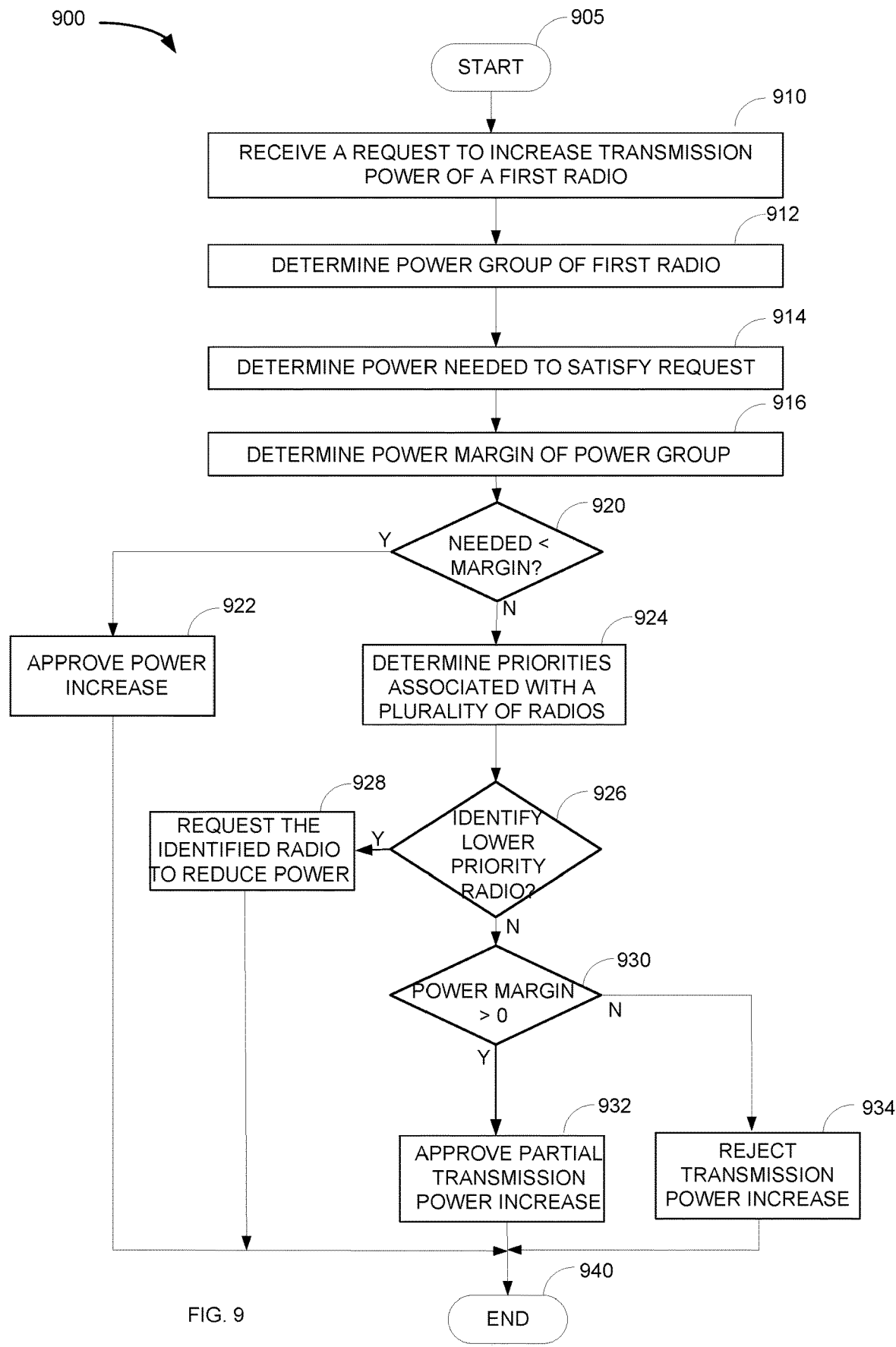
FIG. 9 is a flowchart of an example method for managing transmission power of a radio included in a power group.

FIG. 9 is a flowchart of an example method 900 for managing transmission power of a radio included in a power group. In some embodiments, one or more of the functions discussed below with respect to FIG. 9 and method 900 are performed by the hardware processor 206, 306, 406, or 506. In some embodiments, instructions (e.g. 214, 314, 428, 528) stored in a memory (e.g. 212, 312, 412, 512) configure the hardware processor to perform one or more of the functions discussed below.

After start operation 905, method 900 moves to operation 910. In operation 910, a request is received to approve an increase of transmission power of a first radio. In some embodiments, the request is received from the RRM 654 discussed above with respect to FIG. 6. In some embodiments, the request is received by the power management module 652. Method 900 continues to operation 912, which determines a power group to which the first radio belongs. For example, in some embodiments, operation 912 determines the power group based on a data structure similar to table 700 discussed above with respect to FIG. 7.

Method 900 continues to operation 914 which determines, based on the message, an amount of additional power requested. In some embodiments, the amount of additional power is determined by decoding and/or parsing the request. Method 900 then moves to operation 916, which determines an amount of power margin available in the power group of the first radio. In some embodiments, the power margin is determined according to Equation 3 below:

$$\text{Power Margin}_{Group\ i} = \text{Max power}_{Group\ i} - \text{Used power}_{Group\ i} \quad \text{Equ. 3}$$

where:
- Power Margin$_{Group\ i}$ power available in power-group I under existing operating conditions,
- Max power$_{Group\ i}$ Maximum power that can be collectively consumed by radios in power-group I,
- Used power$_{Group\ i}$ power currently consumed by radios in power-group i.

Method 900 continues to decision operation 920, which determines whether the power margin of the identified power group is sufficient to accommodate the requested power increase of operation 910. If the power margin is adequate, method 900 moves from decision operation 920 to operation 922, which approves the request. Approving the requested power increase in decision operation 920 includes, in some embodiments, sending a message approving the request to increase the transmission power of the first radio. For example, in some embodiments, the message is sent from the power management module 652 to the RRM 654. After decision operation 920, method 900 moves to end operation 940.

If decision operation 920 determines that there is not sufficient power margin available to satisfy the request, method 900 moves from decision operation 920 to operation 924, which determines priorities associated with a plurality of radios included in the power group.

In some embodiments, identities of the radios associated with the same power group as the first radio are determined using a data structure such as the one described in FIG. 7. In some embodiments, priorities of each of the radios is determined, in at least some embodiments, based on Equation 1 in association with the data structure described in FIG. 8.

Method 900 then moves to decision operation 926, which determines whether radios of lower priority than the first radio have been identified. If lower priority radios have been identified, method 900 moves to operation 928, which sends a request to reduce the power of a radio (or radios) that has (have) lower priority than the first said first radio. In some embodiments, the request includes an amount of power reduction needed in order to satisfy the request.

If decision operation 926 determines that there is no radios in the power group that has lower priority than the first said radio, the process proceeds to decision operation 930 where the operation determines whether there is any available power to accommodate partially the RRM request to increase the power of the first radio.

If decision operation 930 determines that the power margin for this power group is greater than zero (however smaller than the requested amount), method 900 moves to operation 932, where a message granting a partial power increase to the first radio is transmitted. In some embodiments, this message is transmitted by the power management module 652 to the RRM 654. In these embodiments, the RRM 654 then increases the transmission power of the first radio up to the power margin of the power group, for example, as described by Equation 3. In some embodiments, the RRM 654 increases the transmission power of the first radio by sending a message instructing said increase to a device including the first radio (e.g. an access point). In some embodiments, the message indicates the power margin of the power group.

If decision operation 930 determines that the power group does not include any power margin is operating at maximum allowed power, method 900 moves to operation 934, which rejects the request. Rejecting the request includes, in some embodiments, transmitting a message (e.g. from the power management module 652 to the RRM 654) indicating the request is rejected. In some embodiments, the transmitted message indicates the power margin of the power group.

In some embodiments, when a request for a power increase is denied, or only partially fulfilled, an alert is generated indicating same. For example, a text message, email message, or other alerting technology is utilized to alert support staff to the failure to provide the requested power increase. In some circumstances, the support staff reconfigures one or more power groups in response to the alert, so as to provide an increase in power margin available to the first radio and/or other radios.

Figure 10A:
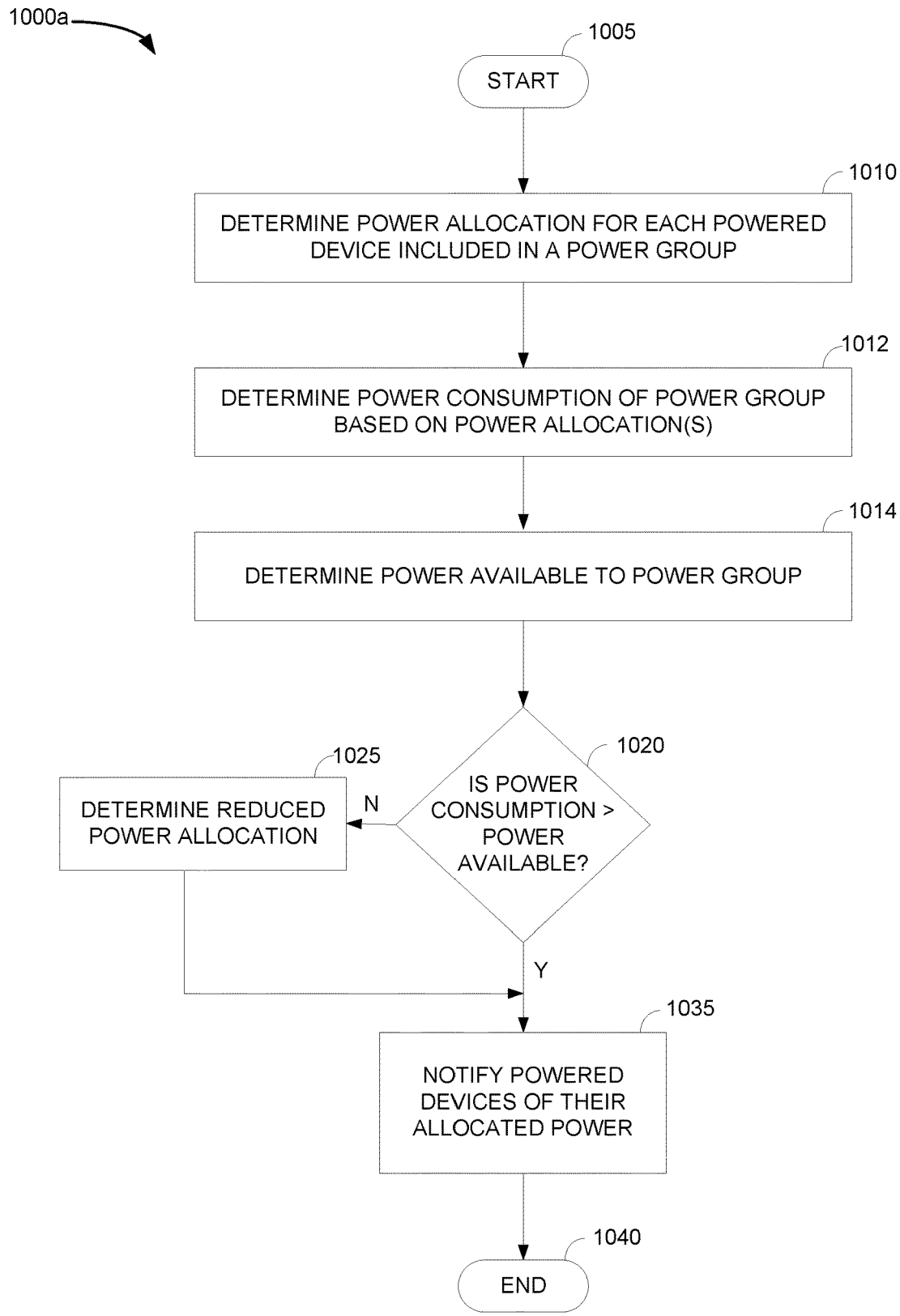
FIG. 10A is a flowchart of an example method for allocating power to powered devices within a power group.

FIG. 10A is a flowchart of an example method for allocating power. In some embodiments, one or more of the functions discussed below with respect to FIG. 10A and the method 1000a are performed by the hardware processor 206, 306, 406, or 506. In some embodiments, instructions (e.g. 214, 314, 428, 528) stored in a memory (e.g. 212, 312, 412, 512) configure the hardware processor to perform one or more of the functions discussed below. Method 1000a of FIG. 10A is utilized by embodiments that seek to optimize SLE and/or performance of a wireless network in an environment wherein there may not be sufficient power to provide optimal network performance. Thus, for example, in these embodiments, as long as power required by devices in a power group is less than power available, devices are allowed to consume power as needed. However, when some power groups require more power than the available power for that group, method 1000a contemplates that when operating in such an environment, the wireless devices are allocated power that ensures acceptable SLE while without violating a constraint imposed by a total amount of available power.

After start operation 1005, method 1000a moves to operation 1010, which determines a power allocation for a power group of powered devices.

Some embodiments of operation 1010 seek to tune a power available to each of a plurality of wireless devices such that an overall service level experience (SLE) is maximized across wireless terminals served by the plurality of wireless devices. For example, in some embodiments, one or more wireless terminals associated with a particular wireless access point are experiencing a relatively high number of dropped calls or other data abnormalities. By increasing a transmission power of the wireless access point, an SLE of those wireless terminals is improved, at least in some embodiments. Thus, in some embodiments, operation 1010 determines a power allocation to a particular powered device in the power group based on one or of a number of wireless terminals served by the powered device, error metrics associated with those wireless terminals, or any of the parameters discussed above with respect to FIG. 8.

In some embodiments, operation 1010 utilizes Equation 2, discussed above, to determine the power allocation for each of the powered devices. It should be noted that Equation 2 determines a power allocation for powered devices included in a particular power group. For example, as discussed above with respect to FIG. 1, each of site 1 102 or site 2 104 each include a plurality of APs. In some embodiments, APs included at site 1 102 are included in a first power group, and a second plurality of APs at site 2 104 are included in a second power group. Other embodiments of operation 1010 determine a power allocation of each of the powered devices in the power group according to other methods besides Equation 2. For example, some embodiments of operation 1010 determine power allocations of each of the devices include in the power group according to any of the techniques discussed above with respect to FIG. 8.

Operation 1012 determines a total power allocation of the power group based on the allocations of operation 1010. In some embodiments, determining the total aggregates the individual device allocations of operation 1010.

Operation 1014 determines power available to the power group. In some embodiments, operation 1014 queries a power management module 652 or its equivalent to determine the power available.

Decision operation 1020 determines whether the amount of the power available to the power group is sufficient to facilitate the determined power consumption of the power group. If there is sufficient power to facilitate the determined power consumption, method 1000a moves from decision operation 1020 to operation 1035 where each of the powered devices is notified of its allocated power.

If decision operation 1020 determines that there is not sufficient power for the determined allocation, method 1000a moves from decision operation 1020 to operation 1025 where a reduced power allocation is made. (One embodiment of determining a reduced power allocation is described in greater detail with reference to FIG. 10B below.) Method 1000a then moves from operation 1025 to operation 1035 where the powered devices in the power group are notified of their power allocation determined in operation 1025.

After operation 1035 completes, method 1000a moves to end operation 1040.

Figure 10B:
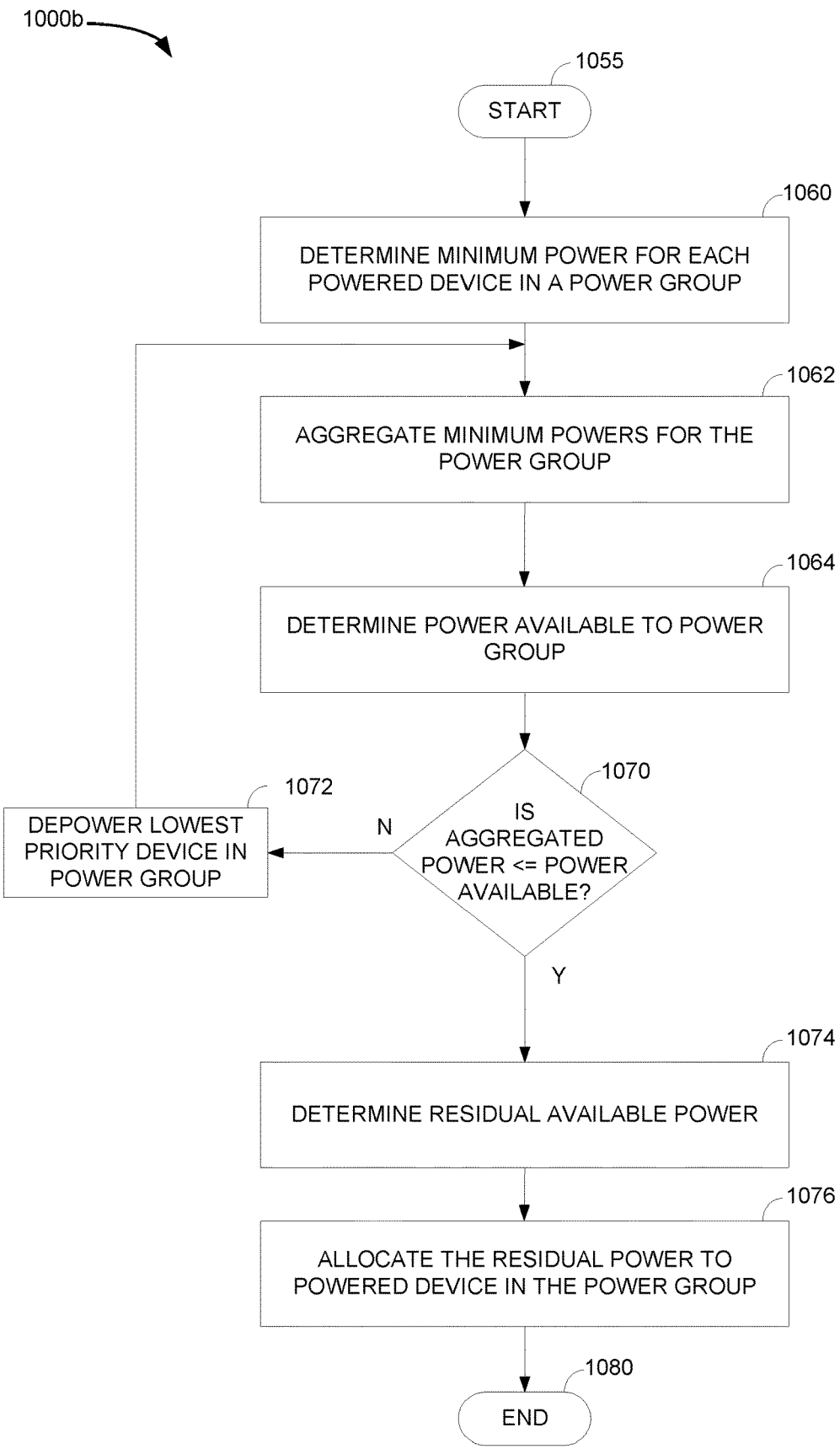
FIG. 10B is a flowchart of an example method for allocating power among powered devices of a power group.

FIG. 10B is a flowchart of an example method for allocating power among competing powered devices when the power they require for operation exceeds the available power for their power group. In some embodiments, one or more of the functions discussed below with respect to FIG. 10B and the method 1000b are performed by the hardware processor 206, 306, 406, or 506. In some embodiments, instructions (e.g. 214, 314, 428, 528) stored in a memory (e.g. 212, 312, 412, 512) configure the hardware processor to perform one or more of the functions discussed below. Method 1000b of FIG. 10B is utilized by embodiments that seek to optimize SLE and/or performance of a wireless network in an environment wherein there may not be sufficient power to provide optimal network performance. Thus, when a power group requires more power than the available power for that power group, method 1000b allocates the available power while attempting to provide a best possible system level experience or a best possible network performance.

After start operation 1055, method 1000b moves to operation 1060 which determines, for each powered device in the power group, the minimal operational power the powered device requires. Operation 1062 determines a total minimum power required by the power group. Operation 1064 determines a total power available for the power group from a power sourcing device.

Decision operation 1070 evaluates whether the power group can be supplied with the minimal power it needs to operate based on the power available. If the power sourcing equipment cannot supply the aggregated minimum amount of power, method 1000*b* moves to operation 1072 where a lowest priority device is identified and that lowest priority device (that still has power allocated to it) is depowered, or in other words, no power is allocated to it. Processing then returns to operation 1062, where a new aggregated minimum power for the power group is determined.

If enough power is available to supply the minimum aggregated power, method 1000*b* moves from decision operation 1070 to operation 1074, which determines a residual power amount. In some embodiments, the residual power amount is determined by Equation 4, shown below:

Residual power=Available power−aggregated required power   Equ. 4

Operation 1076 then allocates the residual power amount to devices included in the power group (not including any devices that were depowered as part of operation 1072).

In some embodiments, residual power is allocated in operation 1076 according to a priority of each of the remaining powered devices. In some embodiments, power is allocated according to the priority such that the highest priority devices are given their full power allocation, until no residual power remains. In some cases, this results in relatively low priority devices receiving no additional power beyond their minimal power requirements (determined by operation 1060 discussed above). In some embodiments, the power allocated to each of these relatively higher priority devices is allocated according to Equation 2, discussed above. In some other embodiments, the power allocated to each of these relatively higher priority devices is allocated according to Equation 5, discussed below. If there is still any residual power left to be allocated, operation 1076 steps down the priority list of powered devices and allocates the power to the next device. The process continues until all of the residual power is allocated to the highest priority devices.

In other embodiments, operation 1076 determines the relative priorities of the various powered devices by $AP_j\ Prio = AP_j\ Power/(\Sigma_{i=1}^{k} P_i)$   Equ. 5 where:
 $AP_j$ Prio priority of the $j^{th}$ powered device in a power group,
 $AP_j$ Power power required by the $j^{th}$ powered device for optimal operation,
 $\Sigma_{i=1}^{k} P_i$ aggregated power of actively powered devices in a power group that enable the devices to operate optimally, and
 k a number of actively powered devices where k is equal or smaller than n, with n being a total number of powered devices in a power group.

Once the priorities of each powered device, such as an AP, in a power group are determined (0<$AP_j$ Prio<1), operation 1076 allocates the residual power according to the relative priorities of the APs. For example, in some embodiments, each powered device is allocated additional power according to Equation 6 below:

Additional power(j)=Residual power*$AP_j$ Prio   Equ. 6

A total power allocated for the $j^{th}$ powered device, such as an APj is given by:

total power(j)=Min P(j)+Additional power(j)   Equ. 7 where:
 total power (j) a total power allocated to an active powered device j,
 Min P(j) a minimum power required by a powered device j, and
 Additional power(j) an additional power allocated from the residual power to powered device j.

After operation 1076 completes, the method 1000*b* moves to end operation 1080.

Figure 11:
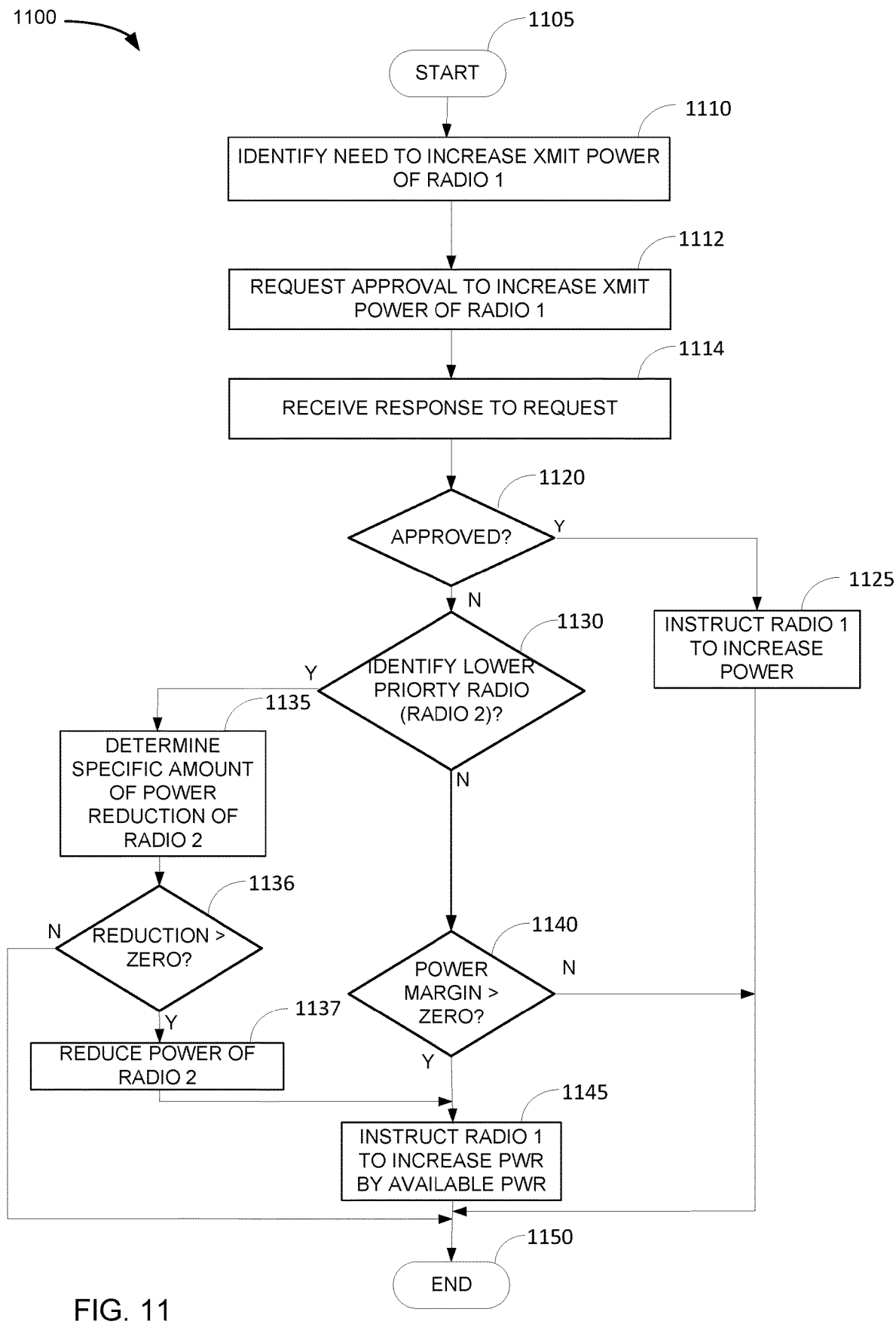
FIG. 11 is a flowchart of an example method for managing power consumption of a radio included in a power group.

FIG. 11 is a flowchart of an example method to coordinate increase of transmission power. In some embodiments, one or more of the functions discussed below with respect to FIG. 11 and the method 1100 are performed by the hardware processor 206, 306, 406, or 506. In some embodiments, instructions (e.g. 214, 314, 428, 528) stored in a memory (e.g. 212, 312, 412, 512) configure the hardware processor to perform one or more of the functions discussed below.

Method 1100 begins at start operation 1105 and then moves to operation 1110 where a need to increase the transmission power of a specific radio is identified. A specific amount of the increase is also determined in operation 1110. In some embodiments, the identification is in response to identifying that increasing the transmission power of the said radio would increase the system level experience (SLE). This may result, for example, in a determination that a received signal strength indicator (RSSI) of signals received from the first radio are below a predefined threshold or meet a predefined criterion. In some embodiments, the RRM 654 makes this determination, and recognizes the need for the transmission power increase.

In operation 1112, a request to increase the transmission (consumption) power of the first (identified) radio is transmitted. In some embodiments, the request is transmitted by the RRM 654 to the power management module 652.

In operation 1114, a reply to the request is received. In some embodiments, the reply is received by the RRM 654. In some embodiments, the reply is generated and sent by the power management module 652.

Decision operation 1120 determines whether the request to increase the power of the first radio by the requested amount has been approved. If the request was approved, method 1100 moves from decision operation 1120 to operation 1125, which instructs the first radio to increase its transmission power by the power amount identified in operation 1110.

If the response message indicates that the request has not been approved, method 1100 moves from decision operation 1120 to decision operation 1130, which evaluates whether a lower priority radio (or radios) are available within the power group. If lower priority radio(s) are identified, method 1100 moves from decision operation 1130 to operation 1135, which determines a specific amount of power reduction of the lower priority radio. In some embodiments, the specific amount of power reduction is based on one or more acceptability criterion for reducing the lower priority radio's power. For example, operation 1135 determines, in some embodiments, whether the lower priority radio is already operating at a minimum power level. The minimum power level represents, in some embodiments, a minimum power level available to provide high priority device functions.

Once the specific amount of power reduction is determined by operation 1135, method 1100 moves from operation 1135 to 1136, which determines if the power reduction is greater than zero. If not, the method 1100 moves from decision operation 1136 to end operation 1150. If the determined power reduction is greater than zero, then the method 1100 moves from decision operation 1136 to operation 1137.

In operation 1137, power of the second radio is reduced. In some embodiments, a message is sent requesting approval to reduce the power consumption of the lower priority radio (radio 2). In some embodiments, the message is transmitted by the RRM 654 to the power management module 652. In some embodiments, operation 1137 is not performed, and the lower priority radio (radio 2) is instructed to reduce its power level in accordance with the reduction determined in operation 1135, without any further request for approval of said reduction. After operation 1137, method 1100 moves to operation 1145, described below.

Returning to the discussion of decision operation 1130, if no lower priority radios are identified, the method 1100 moves from decision operation 1130 to decision operation 1140, which determines if the power margin is greater than zero. As discussed above, the power margin is a difference between a supplied power level and a maximum power level that the power source (e.g. PSE) can deliver. If the power margin is zero, the method 1100 moves from decision operation 1140 to end operation 1150. If the power margin is greater than zero, the method 1100 moves from decision operation 1140 to operation 1145, which instructions the radio to increase power by the available power. The method 1100 then moves from operation 1145 to end operation 1150.

As discussed above with respect to FIG. 9 and method 900, some embodiments generate an alert whenever a need for an increase in transmission power is identified, but cannot be granted, or can only be partially granted. This alert can take the form, in various embodiments, in text message, email message, or other messaging technology. A support staff receiving the alert can, in some circumstances, reconfigure an organization of devices into power groups so as to increase a power available to one or more of the devices.

Figure 12:
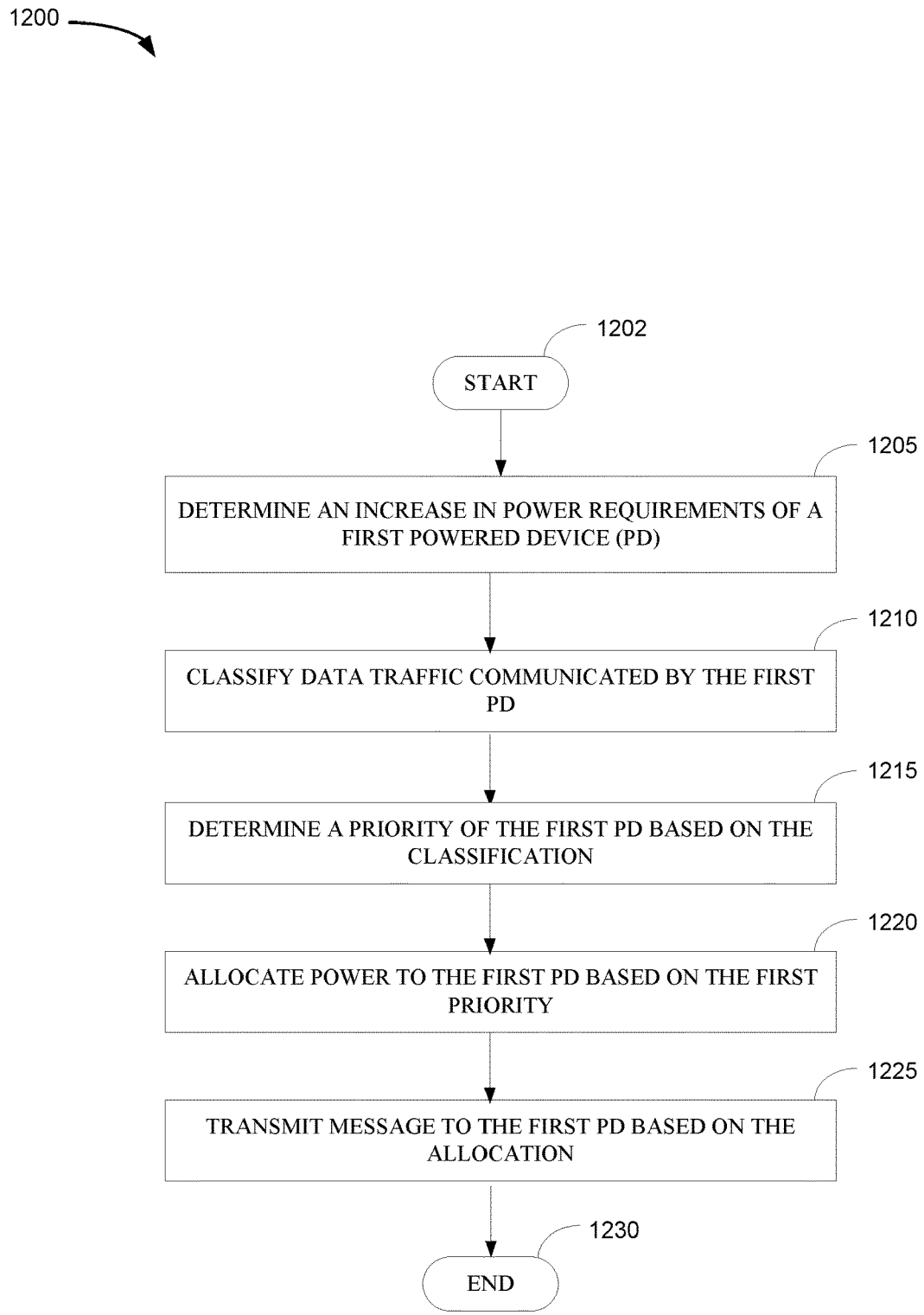
FIG. 12 is a flowchart of an example method for managing power consumption of a device.

FIG. 12 is a flowchart of an example method for managing power consumption of a device. In some embodiments, one or more of the functions discussed below with respect to method 1200 and FIG. 12 are performed by hardware processing circuitry (e.g. hardware processor 206, 306, 406, or 506). In some embodiments, instructions (e.g. 214, 314, 428, 528) stored in a memory (e.g. 212, 312, 412, or 512) configure the hardware processing circuitry to perform one or more of the functions discussed below with respect to FIG. 12.

After start operation 1202, method 1200 moves to operation 1205. In operation 1205, a determination is made that a first powered device's power requirements have changed. In some embodiments, the first powered device is an access point. For example, in some embodiments, method 1200 determines that a received signal strength of signals generated by the first powered device are below a predefined strength threshold when received at one or more other devices. In some embodiments, the one or more other devices include one or more wireless terminals or stations associated with the first powered device and attempting to perform wireless communications with the first powered device. In some embodiments, the one or more other devices include one or more access points that monitor a signal strength of the first powered device. In some embodiments, receive errors are experienced at one or more other devices that receive signals from the first powered device. These receive errors result, in some embodiments, from an RSSI of signals received from the first powered device are below the predefined threshold. Thus, a determination is made that a transmit power level of the first powered device is to be increased, which can result, in some circumstances, to an increased RSSI level at these one or more other devices.

Some embodiments of operation 1205 determine a first amount of the change in the power requirements of the first powered device. In some embodiments, the change in power consumption results from a planned increase in a transmission power of the first powered device.

Operation 1210 classifies data traffic communicated by the first powered device. In some embodiments, the data traffic is analyzed to determine how many video streams and/or bytes of video data are communicated by the first powered device within a predefined elapsed time period (e.g. one minute, two minutes, five minutes, or any elapsed time period). The classification is then based on this analysis. In some embodiments, the data traffic is analyzed to determine how many voice over Internet Protocol (VoIP) streams and/or bytes of VoIP data are communicated by the first powered device within a predefined elapsed time period, and the data traffic is based on the analysis of VoIP traffic. In some embodiments, the data traffic is analyzed to determine a quality of service (QoS) classification of the data traffic communicated by the first powered device within a predefined elapsed time period, and the classification is based on the quality of service of the data traffic. Some embodiments of operation 1210 classify the data traffic according to one or more of the analysis described above.

Operation 1215 determines a priority of the first PD based on the classification and/or analysis of the data traffic performed by operation 1210. In some embodiments, the priority is determined in a similar manner to the priority determination described above with respect to FIG. 8. For example, in some embodiments, the priority is based on Equation 1 and/or Equation 5 discussed above. While operations 1210 and 1215 describe classification of data traffic and prioritization of a single device, some embodiments of operations 1210 and 1215 classify data traffic and prioritize multiple or a plurality of devices, such as access points or other network devices. This classification/prioritization of multiple devices is performed such that power can be allocated among these multiple devices based on the determined classifications and/or priorities, as discussed below with respect to operation 1220.

In operation 1220, power is allocated to the first PD based on the first priority. As discussed above, in some embodiments, power is allocated to a device in proportion to its determined priority. In other embodiments, a plurality of priorities of multiple devices are mapped to power allocations that are based on the priorities, but are not necessarily a proportional allocation. For example, some embodiments utilize a function that receives, as input, a priority, and provides, as output, a power allocation. The function may utilize a non-linear algorithm, such as a logarithmic allocation algorithm, to allocate power based on a device's priority. Some embodiments first allocate a minimum power level to each of a plurality of devices, and then determine a remaining power available based on a total supplied power level minus the minimum power levels allocated to each device. This "discretionary power" is then allocated to each device according to the device's respective priority. This discretionary power is allocated proportionally to each device based on its priority in some embodiments. In some embodiments, the discretionary power allocation is non-linear with respect to the priority. In some embodiments, the discretionary power is allocated according to priorities determined via Equation 1 and/or Equation 5 above. Some embodiments of method 1200 incorporate the features discussed above with respect to FIGS. 10A and/or 10B, as long as there is power available from a power source (e.g. consumed power is less than a maximum power that can be supplied by a power source (e.g. a PSE). In these embodiments, once the maximum power available to a power group is being supplied, competing requests for power are then allocated based on one of the priority based mechanisms described above. Thus, in some examples, a device may experience a relatively substantial reduction in its authorization to consume power, if, for example, it has been consuming a relatively large amount of power to communicate a relatively low priority set of traffic, and then later competition for that power emerges.

In some embodiments of method 1200, a difference between a supplied power level and a maximum power level is determined. In some embodiments, both the supplied power level and the maximum power level relate to a particular power group, of which the first powered device is a member. For example, as discussed above with respect to FIG. 6, some embodiments manage power consumption within a power group (e.g. power group 660), to ensure the devices within the power group do not exceed a maximum amount of power of the power group. Exceeding said maximum power can cause, in some environments, a PSE to turn off power to one or more devices within the power group to ensure the maximum power supplied does not exceed technical limits.

In some embodiments, the difference is then compared to the increase in the power consumption of operation 1205. If the difference is greater than the increase, then the power consumption of the first powered device can be increased by the determined first amount.

In some embodiments, the supplied power level is obtained by querying power sourcing equipment. For example, in some embodiments, the network management system 136 queries a PSE, such as the switch 610 discussed above with respect to FIG. 6, to determine an amount of power consumed by devices connected to the PSE. In some embodiments, the query is specific to a particular power group. (e.g. power consumed by the AP1 620, AP2 630). The PSE provides a response to the query. The response is then parsed or otherwise decoded to determine the supplied power level. In some embodiments, querying of the PSE is accomplished via the Link Layer Discovery Protocol (LLDP).

If the difference is less than the increase, there is not sufficient power margin between the maximum supplied power and the supplied power level to support increasing the power by the determined first amount. Thus, in some embodiments, in order to increase the power margin between the supplied power and the maximum supplied power, some embodiments of operation 1210 request a second powered device to reduce its power consumption. This request for the second powered device to reduce its power consumption is in accordance with any priority determination of the second powered device, for example that is made in some embodiments of operation 1215 (e.g. when the second powered device is included in the multiple devices for which operation 1215 determines priorities).

Such a power consumption reduction by the second powered device will increase the power margin, by reducing the supplied power level. The second powered device and the first powered device are both included in a common power group. Thus, the first powered device and second powered device share, in some embodiments, a common power supply. If one of these devices reduces its power consumption, the unused power is made available for use by the other devices. In some embodiments, whether a request or instruction to the second powered device to decrease its transmission power level is based on a first priority of the first powered device and a second priority of the second device. As discussed above, in some embodiments, a device priority is determined based on network traffic communicated by the device. For example, a quality of service of the traffic is used, in some embodiments, to determine a priority of the device passing the traffic. Thus, if, for example, the first powered device is higher priority than the second powered device, the second power device is instructed to reduce its transmit power level so as to increase power margin and allow the first powered device, which is higher priority, to increase its transmit power level. In contrast, if the second powered device is higher priority than the first powered device, an increase in the first powered device's transmit power level is inhibited, at least in some embodiments, when the difference between the supplied power level and the maximum power level does not support said power increase.

In some embodiments, a second amount is determined based on the comparison of the difference with the first amount. The second amount is equivalent to the difference in some embodiments. The determined amount of increase in power consumption is then reduced relative to the first determined amount, but fits within the margin available between the supplied power level and the maximum power level. The first powered device is then instructed, via the message to increase its transmission power according to the second determined amount.

In some embodiments, a determination is made that the second powered device is to increase its transmission power. As discussed above with respect to FIG. 1, in some embodiments, this decision is a result of an RSSI value of signals received from the second powered device that is below a predefined threshold or otherwise insufficient to provide robust data communication between the second powered device and at least one other device. Some embodiments make this determination based on the RSSI meeting one or more predefined criterion. However, if the priority of the second powered device is lower than any other devices sharing a power supply with the second powered device, and the amount of power margin available between a supplied powered level and a maximum power level is insufficient to support an increase in the second powered device In operation 1225, a message is transmitted to the first powered device based on the difference determined in operation 1210. As discussed above, the message is generated to instruct the first powered device to increase a transmit power level. In some embodiments, the first powered device is instructed to increase a transmit power level according to the first amount. If sufficient power margin is not available to support the first amount, then in some embodiments, the first powered device is instructed, via the message, to increase a transmit power level according to the second amount.

Some embodiments of method 1200 include determining a third power device should increase its power consumption. As discussed above, this determination is based, at least in some embodiments, on a need to improve SLE of a network system. For example, in some circumstances, an RSSI of the third powered device, as measured at a particular location or particular fourth device with which the third powered device is in communication is below a threshold necessary to ensure reliable communications: Thus, by increasing a transmission power of the third powered device, the RSSI might also be improved, and communication also improved. Increasing the transmission power increases a power consumption of the third powered device. To that end, a determination is made as to which power group the third powered device is included. In some cases, the third powered device is within the same power group as the first powered device, discussed above. Alternatively, the third power device is in a different, second power group. A second difference is then determined between a supplied power level of the third powered device's power group, and a maximum supplied power level of the third powered device's power group. As discussed above, this difference is referred to as a power margin of the power group. If the power margin is insufficient to support the power increase, the increase is inhibited in at least some circumstances. Inhibiting the power increase includes rejecting a request to increase the transmit power of the third powered device, at least in some embodiments. For example, as discussed above with respect to FIG. 6, in some embodiments, the RRM 654 requests the power increase from the power management module 652.

In some embodiments, the decision to inhibit the power increase of the third powered device is based on a priority of the third powered device relative to one or more other powered devices included in the third power device's power group. For example, if no lower priority devices are included in the third power device's power group, and the power margin is insufficient to support an increase to the third powered device's power consumption, the request to increase the power of the third powered device is rejected or otherwise denied, thus inhibiting the power increase. Some embodiments generate one or more alerts in response to the inhibiting. For example, the alerts can take the form, in various embodiments, of an email message, text message, or other alert technology. By alerting support staff of the failure to provide an increase in transmission power to the third powered device, steps are taken, in at least some embodiments, to manually rectify the problem, at least in some circumstances. For example, configuration of one or more power groups is modified to provide more power to some devices, and thus alleviate the power shortage evidenced by the inhibiting.

After operation 1225 completes, method 1200 moves to end operation 1230.

In some embodiments the method may start by using the static method for allocating the available power to the powered devices in a power group and then after some packet statistics are collected the system may start utilizing the dynamic method for power allocation as to improve the performance of the network and thus improve the system level experience of the users.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments are implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes are rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules are implemented, in at least some embodiments, using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the hardware processor is achieved, in at least some embodiments, by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules are implemented, in at least some embodiments, purely in hardware, e.g., as circuits, or are implemented in some other embodiments using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. In at least some embodiments, the code is in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The hardware processor is for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus, in various embodiments, are used with IP based and non-IP, wired and wireless such CDMA, orthogonal frequency division multiplexing (OFDM), Wi-Fi, Bluetooth, BLE, optical and/or various other types of communications techniques which are used in at least some embodiments to provide communications links between network attached or associated devices or other devices including receiver/transmitter circuits and logic and/or routines, for implementing the methods.

Although the discussion above describes, in some instances, determining location of a wireless terminal in a two-dimensional space, the features described above are applied, in at least some embodiments, equally to locating a wireless terminal in a three-dimensional space. As such, in a three-dimensional space, rather than determining a location of a WT in a specific cell or region, some of the disclosed embodiments determine a location of a WT within a three-dimensional region when considering a plurality of three-dimensional regions.

Example 1 is a method, comprising: determining a first powered device and a second powered device share a power source; determining an increase in power requirements of the first powered device; first classifying first data traffic communicated by the first powered device; determining a first priority of the first powered device based on the first classifying; second classifying second data traffic communicated by the second powered device; determining a second priority of the second powered device based on the second classifying; comparing the first priority to the second priority; determining whether to increase a power allocation of the first powered device based on the increase in power requirements and the comparing; and transmitting a message to the first powered device based on the determining of whether to increase the power allocation.

In Example 2, the subject matter of Example 1 optionally includes determining a signal attenuation between the first powered device and a least one other wireless device, wherein the first priority is based on the signal attenuation.

In Example 3, the subject matter of any one or more of Examples 1-2 optionally include determining a minimum power requirement of the first powered device; determining a second minimum power requirement of the second powered device; determining a residual power available from a power source based on the first minimum power and the second minimum power, wherein the determination whether to increase the power allocation of the first powered device is further based on the residual power available.

In Example 4, the subject matter of any one or more of Examples 1-3 optionally include wherein the first classifying of the first data traffic is based on a number of voice over Internet Protocol (VoIP) streams communicated by the first powered device during a predefined elapsed time period.

In Example 5, the subject matter of any one or more of Examples 1-4 optionally include wherein the first classifying of the first data traffic is based on a number of video streams communicated by the first powered device during a predefined elapsed time period.

In Example 6, the subject matter of any one or more of Examples 1-5 optionally include wherein the first priority is further based on a number of neighboring devices of the first powered device with a received signal strength above a predefined threshold.

In Example 7, the subject matter of any one or more of Examples 1-6 optionally include wherein the first classifying of the first data traffic is based on a quality of service classification of the first data traffic during a predefined elapsed time period.

In Example 8, the subject matter of any one or more of Examples 1-7 optionally include wherein the determination of whether to increase the power allocation comprises: allocating power to the first powered device and second powered device in proportion to the first priority and second priority respectively; and second comparing the power allocated to the first powered device to the increase in power requirements, wherein the transmitting of the message is based on the second comparing.

In Example 9, the subject matter of any one or more of Examples 1-8 optionally include wherein the determination of whether to increase the power allocation comprises: allocating power to the first powered device and second powered device according to a non-linear response to the first priority and second priority respectively; and second comparing the power allocated to the first powered device to the increase in power requirements, wherein the transmitting of the message is based on the second comparing.

In Example 10, the subject matter of any one or more of Examples 1-9 optionally include determining that an increase in transmission power of a radio of the AP will improve a SLE, wherein the first powered device is an access point (AP) and the increase in power requirements results from the determination that an increase in transmission power of a radio of the AP.

In Example 11, the subject matter of Example 10 optionally includes determining a received signal strength indication (RSSI) of a signal transmitted by the first powered device meets a criterion, wherein the determining that the increase in transmit power will improve the SLE is based on the determining that the RSSI meets the criterion.

In Example 12, the subject matter of any one or more of Examples 1-11 optionally include determining a difference between a power level supplied by the power source and a maximum power level of the power source; determining a first amount of the increase in power requirements of the first powered device; and comparing the first amount to the difference, wherein the determining of whether to increase the power allocation is based on the comparing.

In Example 13, the subject matter of Example 12 optionally includes determining a second amount less than the first amount based on the comparing, wherein the determining of whether to increase the power allocation is based on the second amount.

In Example 14, the subject matter of Example 13 optionally includes determining the first amount exceeds the difference, wherein the second amount is determined in response to the first amount exceeding the difference.

In Example 15, the subject matter of Example 14 optionally includes transmitting a request to the second powered device to reduce power consumption below an allocated level, wherein the transmitting of the request is in response to the difference.

In Example 16, the subject matter of any one or more of Examples 12-15 optionally include determining an increase in power requirements of the second powered device; determining, a second difference between a second current supplied power level and the maximum supplied power level; and inhibiting increasing a power consumption of the second powered device based on the second difference.

In Example 17, the subject matter of Example 16 optionally includes determining the second priority of the second powered device is lower than the first priority, wherein the inhibiting is based on the determining.

In Example 18, the subject matter of Example 17 optionally includes generating an alert indicating the inhibiting.

In Example 19, the subject matter of any one or more of Examples 1-18 optionally include querying the power source, the query requesting a supplied power level of the power source; receiving, from the power source, a response to the query; decoding the response; and determining, based on the decoding, the supplied power level, wherein the determining of the whether to increase the power allocation is based on the supplied power level.

In Example 20, the subject matter of Example 19 optionally includes wherein the query is transmitted to the power source via a Link Layer Discovery Protocol (LLDP).

Example 21 is a non-transitory computer readable storage medium comprising instructions that when executed configure hardware processing circuitry to perform operations comprising: determining a first powered device and a second powered device share a power source; determining an increase in power requirements of the first powered device; first classifying first data traffic communicated by the first powered device; determining a first priority of the first powered device based on the first classifying; second classifying second data traffic communicated by the second powered device; determining a second priority of the second powered device based on the second classifying; comparing the first priority to the second priority; determining whether to increase a power allocation of the first powered device based on the increase in power requirements and the comparing; and transmitting a message to the first powered device based on the determining of whether to increase the power allocation.

In Example 22, the subject matter of Example 21 optionally includes the operations further comprising determining a signal attenuation between the first powered device and a least one other wireless device, wherein the first priority is based on the signal attenuation.

In Example 23, the subject matter of any one or more of Examples 21-22 optionally include the operations further comprising: determining a minimum power requirement of the first powered device; determining a second minimum power requirement of the second powered device; determining a residual power available from a power source based on the first minimum power and the second minimum power, wherein the determination whether to increase the power allocation of the first powered device is further based on the residual power available.

In Example 24, the subject matter of any one or more of Examples 21-23 optionally include wherein the first classifying of the first data traffic is based on a number of voice over Internet Protocol (VoIP) streams communicated by the first powered device during a predefined elapsed time period.

In Example 25, the subject matter of any one or more of Examples 21-24 optionally include wherein the first classifying of the first data traffic is based on a number of video streams communicated by the first powered device during a predefined elapsed time period.

In Example 26, the subject matter of any one or more of Examples 21-25 optionally include wherein the first priority is further based on a number of neighboring devices of the first powered device with a received signal strength above a predefined threshold.

In Example 27, the subject matter of any one or more of Examples 21-26 optionally include wherein the first classifying of the first data traffic is based on a quality of service classification of the first data traffic during a predefined elapsed time period.

In Example 28, the subject matter of any one or more of Examples 21-27 optionally include wherein the determination of whether to increase the power allocation comprises: allocating power to the first powered device and second powered device in proportion to the first priority and second priority respectively; and second comparing the power allocated to the first powered device to the increase in power requirements, wherein the transmitting of the message is based on the second comparing.

In Example 29, the subject matter of any one or more of Examples 21-28 optionally include wherein the determination of whether to increase the power allocation comprises: allocating power to the first powered device and second powered device according to a non-linear response to the first priority and second priority respectively; and second comparing the power allocated to the first powered device to the increase in power requirements, wherein the transmitting of the message is based on the second comparing.

In Example 30, the subject matter of any one or more of Examples 21-29 optionally include the operations further comprising determining that an increase in transmission power of a radio of the AP will improve a SLE, wherein the first powered device is an access point (AP) and the increase in power requirements results from the determination that an increase in transmission power of a radio of the AP.

In Example 31, the subject matter of Example 30 optionally includes the operations further comprising determining a received signal strength indication (RSSI) of a signal transmitted by the first powered device meets a criterion, wherein the determining that the increase in transmit power will improve the SLE is based on the determining that the RSSI meets the criterion.

In Example 32, the subject matter of any one or more of Examples 21-31 optionally include the operations further comprising: determining a difference between a power level supplied by the power source and a maximum power level of the power source; determining a first amount of the increase in power requirements of the first powered device; and comparing the first amount to the difference, wherein the determining of whether to increase the power allocation is based on the comparing.

In Example 33, the subject matter of Example 32 optionally includes the operations further comprising determining a second amount less than the first amount based on the comparing, wherein the determining of whether to increase the power allocation is based on the second amount.

In Example 34, the subject matter of Example 33 optionally includes the operations further comprising determining the first amount exceeds the difference, wherein the second amount is determined in response to the first amount exceeding the difference.

In Example 35, the subject matter of Example 34 optionally includes the operations further comprising transmitting a request to the second powered device to reduce power consumption below an allocated level, wherein the transmitting of the request is in response to the difference.

In Example 36, the subject matter of Example 35 optionally includes the operations further comprising: determining an increase in power requirements of the second powered device; determining, a second difference between a second current supplied power level and the maximum supplied power level; and inhibiting increasing a power consumption of the second powered device based on the second difference.

In Example 37, the subject matter of Example 36 optionally includes the operations further comprising determining the second priority of the second powered device is lower than the first priority, wherein the inhibiting is based on the determining.

In Example 38, the subject matter of Example 37 optionally includes the operations further comprising generating an alert indicating the inhibiting.

In Example 39, the subject matter of any one or more of Examples 21-38 optionally include the operations further comprising: querying the power source, the query requesting a supplied power level of the power source; receiving, from the power source, a response to the query; decoding the response; and determining, based on the decoding, the supplied power level, wherein the determining of the whether to increase the power allocation is based on the supplied power level.

In Example 40, the subject matter of Example 39 optionally includes wherein the query is transmitted to the power source via a Link Layer Discovery Protocol (LLDP).

Example 41 is a system, comprising: hardware processing circuitry; one or more hardware memories comprising instructions that when executed configure the hardware processing circuitry to perform operations comprising: determining a first powered device and a second powered device share a power source; determining an increase in power requirements of the first powered device; first classifying first data traffic communicated by the first powered device; determining a first priority of the first powered device based on the first classifying; second classifying second data traffic communicated by the second powered device; determining a second priority of the second powered device based on the second classifying; comparing the first priority to the second priority; determining whether to increase a power allocation of the first powered device based on the increase in power requirements and the comparing; and transmitting a message to the first powered device based on the determining of whether to increase the power allocation.

In Example 42, the subject matter of Example 41 optionally includes the operations further comprising determining a signal attenuation between the first powered device and a least one other wireless device, wherein the first priority is based on the signal attenuation.

In Example 43, the subject matter of any one or more of Examples 41-42 optionally include the operations further comprising: determining a minimum power requirement of the first powered device; determining a second minimum power requirement of the second powered device; determining a residual power available from a power source based on the first minimum power and the second minimum power, wherein the determination whether to increase the power allocation of the first powered device is further based on the residual power available.

In Example 44, the subject matter of any one or more of Examples 41-43 optionally include wherein the first classifying of the first data traffic is based on a number of voice over Internet Protocol (VoIP) streams communicated by the first powered device during a predefined elapsed time period.

In Example 45, the subject matter of any one or more of Examples 41-44 optionally include wherein the first classifying of the first data traffic is based on a number of video streams communicated by the first powered device during a predefined elapsed time period.

In Example 46, the subject matter of any one or more of Examples 41-45 optionally include wherein the first priority is further based on a number of neighboring devices of the first powered device with a received signal strength above a predefined threshold.

In Example 47, the subject matter of any one or more of Examples 41-46 optionally include wherein the first classifying of the first data traffic is based on a quality of service classification of the first data traffic during a predefined elapsed time period.

In Example 48, the subject matter of any one or more of Examples 41-47 optionally include wherein the determination of whether to increase the power allocation comprises: allocating power to the first powered device and second powered device in proportion to the first priority and second priority respectively; and second comparing the power allocated to the first powered device to the increase in power requirements, wherein the transmitting of the message is based on the second comparing.

In Example 49, the subject matter of any one or more of Examples 41-48 optionally include wherein the determination of whether to increase the power allocation comprises: allocating power to the first powered device and second powered device according to a non-linear response to the first priority and second priority respectively; and second comparing the power allocated to the first powered device to the increase in power requirements, wherein the transmitting of the message is based on the second comparing.

In Example 50, the subject matter of any one or more of Examples 41-49 optionally include the operations further comprising determining that an increase in transmission power of a radio of the AP will improve a SLE, wherein the first powered device is an access point (AP) and the increase in power requirements results from the determination that an increase in transmission power of a radio of the AP.

In Example 51, the subject matter of any one or more of Examples 30-50 optionally include the operations further comprising determining a received signal strength indication (RSSI) of a signal transmitted by the first powered device meets a criterion, wherein the determining that the increase in transmit power will improve the SLE is based on the determining that the RSSI meets the criterion.

In Example 52, the subject matter of any one or more of Examples 41-51 optionally include the operations further comprising: determining a difference between a power level supplied by the power source and a maximum power level of the power source; determining a first amount of the increase in power requirements of the first powered device; and comparing the first amount to the difference, wherein the determining of whether to increase the power allocation is based on the comparing.

In Example 53, the subject matter of any one or more of Examples 42-52 optionally include the operations further comprising determining a second amount less than the first amount based on the comparing, wherein the determining of whether to increase the power allocation is based on the second amount.

In Example 54, the subject matter of any one or more of Examples 43-53 optionally include the operations further comprising determining the first amount exceeds the difference, wherein the second amount is determined in response to the first amount exceeding the difference.

In Example 55, the subject matter of any one or more of Examples 44-54 optionally include the operations further comprising transmitting a request to the second powered device to reduce power consumption below an allocated level, wherein the transmitting of the request is in response to the difference.

In Example 56, the subject matter of any one or more of Examples 45-55 optionally include the operations further comprising: determining an increase in power requirements of the second powered device; determining, a second difference between a second current supplied power level and the maximum supplied power level; and inhibiting increasing a power consumption of the second powered device based on the second difference.

In Example 57, the subject matter of any one or more of Examples 46-56 optionally include the operations further comprising determining the second priority of the second powered device is lower than the first priority, wherein the inhibiting is based on the determining.

In Example 58, the subject matter of any one or more of Examples 47-57 optionally include the operations further comprising generating an alert indicating the inhibiting.

In Example 59, the subject matter of any one or more of Examples 41-58 optionally include the operations further comprising: querying the power source, the query requesting a supplied power level of the power source; receiving, from the power source, a response to the query; decoding the response; and determining, based on the decoding, the supplied power level, wherein the determining of the whether to increase the power allocation is based on the supplied power level.

In Example 60, the subject matter of Example 59 optionally includes wherein the query is transmitted to the power source via a Link Layer Discovery Protocol (LLDP).

The invention claimed is:

1. A method, comprising:
   determining a first powered device and a second powered device share a power source;
   determining an increase in power requirements of the first powered device;
   first classifying first data traffic communicated by the first powered device;
   determining a first priority of the first powered device based on the first classifying;
   second classifying second data traffic communicated by the second powered device;
   determining a second priority of the second powered device based on the second classifying;
   comparing the first priority to the second priority;
   determining whether to increase a power allocation of the first powered device based on the increase in power requirements and the comparing; and
   transmitting a message to the first powered device based on the determining of whether to increase the power allocation.

2. The method of claim 1, further comprising determining a signal attenuation between the first powered device and a least one other wireless device, wherein the first priority is based on the signal attenuation.

3. The method of claim 1, wherein the first classifying of the first data traffic is based on a number of voice over Internet Protocol (VoIP) streams communicated by the first powered device during a predefined elapsed time period.

4. The method of claim 1, wherein the first classifying of the first data traffic is based on a number of video streams communicated by the first powered device during a predefined elapsed time period.

5. The method of claim 1, wherein the first priority is further based on a number of neighboring devices of the first powered device with a received signal strength above a predefined threshold.

6. A system, comprising:
   hardware processing circuitry; and
   one or more hardware memories comprising instructions that when executed configure the hardware processing circuitry to perform operations comprising:
   determining a first powered device and a second powered device share a power source;
   determining an increase in power requirements of the first powered device;
   first classifying first data traffic communicated by the first powered device;
   determining a first priority of the first powered device based on the first classifying;
   second classifying second data traffic communicated by the second powered device;
   determining a second priority of the second powered device based on the second classifying;
   comparing the first priority to the second priority;
   determining whether to increase a power allocation of the first powered device based on the increase in power requirements and the comparing; and
   transmitting a message to the first powered device based on the determining of whether to increase the power allocation.

7. The system of claim 6, the operations further comprising determining a signal attenuation between the first powered device and a least one other wireless device, wherein the first priority is based on the signal attenuation.

8. The system of claim 6, the operations further comprising:
   determining a minimum power requirement of the first powered device;
   determining a second minimum power requirement of the second powered device; and determining a residual power available from a power source based on the first minimum power and the second minimum power, wherein the determination whether to increase the power allocation of the first powered device is further based on the residual power available.

9. The system of claim 6, wherein the first classifying of the first data traffic is based on a number of voice over Internet Protocol (VoIP) streams communicated by the first powered device during a predefined elapsed time period.

10. The system of claim 6, wherein the first classifying of the first data traffic is based on a number of video streams communicated by the first powered device during a predefined elapsed time period.

11. The system of claim 6, wherein the first priority is further based on a number of neighboring devices of the first powered device with a received signal strength above a predefined threshold.

12. The system of claim 6, wherein the first classifying of the first data traffic is based on a quality of service classification of the first data traffic during a predefined elapsed time period.

13. The system of claim 6, wherein the determination of whether to increase the power allocation comprises:
    allocating power to the first powered device and second powered device in proportion to the first priority and second priority respectively; and
    second comparing the power allocated to the first powered device to the increase in power requirements, wherein the transmitting of the message is based on the second comparing.

14. The system of claim 6, wherein the determination of whether to increase the power allocation comprises:
    allocating power to the first powered device and second powered device according to a non-linear response to the first priority and second priority respectively; and
    second comparing the power allocated to the first powered device to the increase in power requirements, wherein the transmitting of the message is based on the second comparing.

15. The system of claim 6, the operations further comprising determining that an increase in transmission power of a radio of the AP will improve a SLE, wherein the first powered device is an access point (AP) and the increase in power requirements results from the determination that an increase in transmission power of a radio of the AP.

16. The system of claim 15, the operations further comprising determining a received signal strength indication (RSSI) of a signal transmitted by the first powered device meets a criterion, wherein the determining that the increase in transmit power will improve the SLE is based on the determining that the RSSI meets the criterion.

17. The system of claim 16, the operations further comprising:
    determining a difference between a power level supplied by the power source and a maximum power level of the power source;
    determining a first amount of the increase in power requirements of the first powered device; and
    comparing the first amount to the difference, wherein the determining of whether to increase the power allocation is based on the comparing.

18. The system of claim 17, the operations further comprising determining a second amount less than the first amount based on the comparing, wherein the determining of whether to increase the power allocation is based on the second amount.

19. The system of claim 18, the operations further comprising determining the first amount exceeds the difference, wherein the second amount is determined in response to the first amount exceeding the difference.

20. A non-transitory computer readable storage medium comprising instructions that when executed configure hardware processing circuitry to perform operations comprising:
    determining a first powered device and a second powered device share a power source;
    determining an increase in power requirements of the first powered device;
    first classifying first data traffic communicated by the first powered device;
    determining a first priority of the first powered device based on the first classifying;
    second classifying second data traffic communicated by the second powered device;
    determining a second priority of the second powered device based on the second classifying;
    comparing the first priority to the second priority;
    determining whether to increase a power allocation of the first powered device based on the increase in power requirements and the comparing; and
    transmitting a message to the first powered device based on the determining of whether to increase the power allocation.

* * * * *